US012221529B2

(12) United States Patent
Sakai et al.

(10) Patent No.: US 12,221,529 B2
(45) Date of Patent: Feb. 11, 2025

(54) ETHYLENE COPOLYMER COMPOSITION AND USE THEREOF

(71) Applicant: MITSUI CHEMICALS, INC., Tokyo (JP)

(72) Inventors: Tatsuya Sakai, Chiba (JP); Kiminori Noda, Mobara (JP); Nozomi Kamiya, Chiba (JP)

(73) Assignee: MITSUI CHEMICALS, INC. (JP)

( * ) Notice: Subject to any disclaimer, the term of this patent is extended or adjusted under 35 U.S.C. 154(b) by 322 days.

(21) Appl. No.: 17/770,859

(22) PCT Filed: Oct. 20, 2020

(86) PCT No.: PCT/JP2020/039320
§ 371 (c)(1),
(2) Date: Apr. 21, 2022

(87) PCT Pub. No.: WO2021/085225
PCT Pub. Date: May 6, 2021

(65) Prior Publication Data
US 2022/0372260 A1  Nov. 24, 2022

(30) Foreign Application Priority Data
Oct. 29, 2019  (JP) ................................ 2019-196473

(51) Int. Cl.
| | |
|---|---|
| *C08L 23/08* | (2006.01) |
| *A43B 13/04* | (2006.01) |
| *B32B 5/18* | (2006.01) |
| *C08J 9/00* | (2006.01) |
| *C08J 9/10* | (2006.01) |
| *C08J 9/36* | (2006.01) |
| *C08L 23/16* | (2006.01) |

(52) U.S. Cl.
CPC .......... *C08L 23/0853* (2013.01); *A43B 13/04* (2013.01); *B32B 5/18* (2013.01); *C08J 9/0061* (2013.01); *C08J 9/103* (2013.01); *C08J 9/365* (2013.01); *C08L 23/16* (2013.01); *B32B 2266/0221* (2013.01); *B32B 2266/025* (2013.01); *B32B 2305/022* (2013.01); *B32B 2437/02* (2013.01); *C08J 2201/026* (2013.01); *C08J 2203/04* (2013.01); *C08J 2323/08* (2013.01); *C08J 2323/16* (2013.01); *C08J 2423/08* (2013.01); *C08J 2423/16* (2013.01); *C08L 2203/14* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 8,993,647 B2 | 3/2015 | Kajihara et al. | |
| 9,133,327 B2 | 9/2015 | Wu et al. | |
| 2009/0126234 A1 | 5/2009 | Kajihara et al. | |
| 2009/0249645 A1 | 10/2009 | Kajihara et al. | |
| 2014/0357799 A1 | 12/2014 | Wu et al. | |
| 2015/0210838 A1* | 7/2015 | Wu .......................... | C08L 9/00 428/36.9 |
| 2015/0225526 A1 | 8/2015 | Tu et al. | |
| 2016/0331073 A1 | 11/2016 | Nakano et al. | |

FOREIGN PATENT DOCUMENTS

| | | |
|---|---|---|
| JP | H06-107840 A | 4/1994 |
| JP | H1036580 A | 2/1998 |
| JP | 2006-249136 A | 9/2006 |
| JP | 2008-308619 A | 12/2008 |
| JP | 2014-526576 A | 10/2014 |
| JP | 2015-521670 A | 7/2015 |
| WO | WO-2007/132731 A1 | 11/2007 |
| WO | WO-2015/129414 A1 | 9/2015 |

* cited by examiner

*Primary Examiner* — Chinessa T. Golden
(74) *Attorney, Agent, or Firm* — FOLEY & LARDNER LLP

(57) ABSTRACT

An object of the present invention is to provide a composition capable of allowing for production of a crosslinked foamed product suitable for applications of footwear parts such as soles and excellent in properties such as lightweight properties, heat shrinkability, compression set and mechanical strength in a well-balanced manner, a foamed product using the composition and a footwear part using the same. An ethylene copolymer composition including an ethylene copolymer (A) satisfying all the following requirements (A-a), (A-b), (A-c) and (A-d), ethylene/α-olefin having 3 to 20 carbon atoms/non-conjugated polyene copolymer rubber (B), and, if necessary, an ethylene/polar monomer copolymer (C); (A-a) a vinyl group content per 1,000 carbon atoms is 0.025 to 0.3, (A-b) $MFR_{10}/MFR_{2.16}$ is 7 to 20, (A-c) a density is 0.850 to 0.910 g/cm³, and (A-d) a melt flow rate is 0.01 to 200 g/10 min.

17 Claims, No Drawings

ETHYLENE COPOLYMER COMPOSITION AND USE THEREOF

CROSS-REFERENCE TO RELATED APPLICATIONS

The present application claims priority under 37 U.S.C. § 371 to International Patent Application No. PCT/JP2020/039320, filed Oct. 20, 2020, which claims priority to and the benefit of Japanese Patent Application No 2019-196473, filed on Oct. 29, 2019. The contents of these applications are hereby incorporated by reference in their entireties.

TECHNICAL FIELD

The present invention relates to an ethylene copolymer composition, a foamed product including the composition, and use thereof. Specifically, the present invention relates to a composition including an ethylene/α-olefin copolymer and an ethylene/α-olefin-/non-conjugated polyene copolymer, a foamed product including the composition, and use thereof.

BACKGROUND ART

A crosslinked foamed product of a resin is used for footwear or footwear parts, such as shoe soles (mainly, midsoles) for sports shoes and the like, because footwear or footwear parts are required to satisfy requirements such as light weight, prevention of deformation due to long-term use, and mechanical strength and rebound resilience durable against severe conditions.

A crosslinked foamed product obtained by crosslinking an ethylene/vinyl acetate copolymer (EVA) with peroxide has been conventionally widely used for shoe soles. Such a crosslinked foamed product formed using the ethylene/vinyl acetate copolymer has a relatively high specific gravity and a large compression set, and when used for, for example, shoe soles, it has thus the problems of being heavy and being lost in mechanical strength such as rebound resilience by compression of shoe soles due to long-term use. Thus, attempts have been made to blend polyolefin rubber having a higher crosslinking efficiency than an ethylene/vinyl acetate copolymer, such as ethylene/l-butene rubber (EBR) or ethylene/octene rubber (EOR) in order to further enhance compression set and mechanical strength of a foamed product of an ethylene/vinyl acetate copolymer.

Since it is known that a material lower in crystallinity is more favorable in rebound resilience, attempts have been made to blend an ethylene/vinyl acetate copolymer (EVA) and an ethylene/propylene/diene copolymer (EPDM) when particularly high rebound resilience is required. However, a problem here is that heat shrinkability and mechanical strength are insufficient, and mechanical strength has been compensated by further addition of polyolefinic rubber high in crystallinity in some cases.

An ethylene/α-olefin copolymer has been conventionally used in various applications. Since, for example, a crosslinked foamed product using an ethylene/α-olefin copolymer has high mechanical strength and is lightweight and flexible, it is used for interior and exterior materials for construction, automotive parts such as door glass run channels, packaging materials, daily necessities and the like. A foamed product not crosslinked has low mechanical strength, although a reduction in weight is achieved, and thus, when the foamed product is used in the above applications, mechanical strength is enhanced by performing a crosslinking reaction of a resin to thereby bind a molecular chain in the foamed product.

The present applicant has found that a crosslinked foamed product using an ethylene/α-olefin copolymer is suitable as a raw material of a more lightweight footwear part, and has conventionally made various studies. The present applicant has specifically found that a foamed product including a composition including an ethylene polymer and EPDM (See Patent Literature 1) and a foamed product including a composition including ethylene/α-olefin copolymer having a vinyl group (See Patent Literature 2 and Patent Literature 3) are low in specific gravity and small in compression set, and suitable for footwear parts.

Patent Literature 4 describes a crosslinked foamed product useful for footwear applications, which is obtained by using a foamable formulation including an ethylene/α-olefin copolymer having a vinyl group and which has a high hardness and a low compression set.

CITATION LIST

Patent Literature

Patent Literature 1: International Publication No. WO 2007/132731
Patent Literature 2: International Publication No. WO 2015/129414
Patent Literature 3: Japanese Patent Laid-Open No. 2008-308619
Patent Literature 4: Japanese Translation of PCT International Application Publication No. 2015-521670

SUMMARY OF INVENTION

Technical Problem

An object of the present invention is to provide a composition capable of allowing for production of a crosslinked foamed product suitable for applications of footwear parts such as soles and excellent in properties such as lightweight properties, heat shrinkability, compression set and mechanical strength in a well-balanced manner, a foamed product using the composition and a footwear part using the same.

Solution to Problem

The present invention relates to, for example, the following [1] to [15].

[1]
An ethylene copolymer composition comprising:
an ethylene copolymer (A) which is a copolymer obtained by copolymerizing only ethylene and an α-olefin having 3 to 20 carbon atoms and which satisfies all the following requirements (A-a), (A-b), (A-c) and (A-d),
ethylene/α-olefin having 3 to 20 carbon atoms/non-conjugated polyene copolymer rubber (B), and
an ethylen/polar monomer copolymer (C);
(A-a) a vinyl group content per 1,000 carbon atoms as determined by $^1$H-NMR is in the range of 0.025 to 0.3,
(A-b) a ratio $MFR_{10}/MFR_{2.16}$ is in the range of 7 to 20 (wherein $MFR_{10}$ is a melt flow rate as measured at 190° C. and at a load of 10 kg by a method according to ASTM D1238, and $MFR_{2.16}$ is a melt flow rate as measured at 190° C. and at a load of 2.16 kg by a method according to ASTM D1238), (A-c) a density is in the range of 0.850 to 0.910 g/cm$^3$, and
(A-d) a melt flow rate (MFR$_{2.16}$) as measured at 190° C. and at a load of 2.16 kg by a method according to ASTM D1238 is in the range of 0.01 to 200 g/10 min.

[2]

An ethylene copolymer composition comprising 5 to 30 parts by mass of an ethylene copolymer (A) which is a copolymer obtained by copolymerizing only ethylene and an α-olefin having 3 to 20 carbon atoms and which satisfies all the following requirements (A-a), (A-b), (A-c) and (A-d), 95 to 70 parts by mass of ethylene/α-olefin having 3 to 20 carbon atoms/non-conjugated polyene copolymer rubber (B) satisfying at least one of the following requirements (B-a) and (B-b) (wherein a total amount of the ethylene copolymer (A) and the ethylene/α-olefin having 3 to 20 carbon atoms/non-conjugated polyene copolymer rubber (B) is 100 parts by mass);

(A-a) a vinyl group content per 1,000 carbon atoms as determined by $^1$H-NMR is in the range of 0.025 to 0.3, (A-b) a ratio MFR$_{10}$/MFR$_{2.16}$ is in the range of 7 to 20 (wherein MFR$_{10}$ is a melt flow rate as measured at 190° C. and at a load of 10 kg by a method according to ASTM D1238, and MFR$_{2.16}$ is a melt flow rate as measured at 190° C. and at a load of 2.16 kg by a method according to ASTM D1238), (A-c) a density is in the range of 0.850 to 0.910 g/cm$^3$, and (A-d) a melt flow rate (MFR$_{2.16}$) as measured at 190° C. and at a load of 2.16 kg by a method according to ASTM D1238 is in the range of 0.01 to 200 g/10 min, and (B-a) a content of a constitutional unit derived from ethylene is in the range of 60 to 95% by mass, and (B-b) a Mooney viscosity (ML$_{1+4}$) as measured at 100° C. by a method according to JIS K6395 is in the range of 50 to 120.

[3]

The ethylene copolymer composition according to [1], wherein a mass ratio [(A)/(B)] between the ethylene copolymer (A) and the ethylene/α-olefin having 3 to 20 carbon atoms/non-conjugated polyene copolymer rubber (B) is in the range of 5/95 to 80/20.

[4]

The ethylene copolymer composition according to any of [1] to [3], wherein the ethylene copolymer (A) is an ethylene/1-butene copolymer.

[5]

The ethylene copolymer composition according to any of [2] to [4], further comprising an ethylene/polar monomer copolymer (C).

[6]

The ethylene copolymer composition according to [1] or [5], wherein a mass ratio [(A)/(C)] between the ethylene copolymer (A) and the ethylene/polar monomer copolymer (C) is in the range of 1/99 to 39/61.

[7]

The ethylene copolymer composition according to any of [1] to [6], further comprising a foaming agent (D), a crosslinking agent (E) or a combination thereof.

[8]

A foamed product obtained by crosslinking and foaming the ethylene copolymer composition according to [7].

[9]

The foamed product according to [8], wherein a rebound resilience as measured by a method according to JIS K6255 is 55% or more.

[10]

The foamed product according to [8] or [9], wherein a heat shrinkage rate (Sh) after a lapse of 30 minutes under an environment of 23° C. after heat treatment of the foamed product under an environment of 70° C. for 60 minutes is less than 3.0%.

[11]

A laminated product having a layer including the foamed product according to any of [8] to [10] and a layer including one or more raw materials selected from the group consisting of polyolefin, polyurethane, rubber, leather and artificial leather.

[12]

Footwear obtained by using the foamed product according to any of [8] to [10] or the laminated product according to [11].

[13]

A footwear part obtained by using the foamed product according to any of [8] to [10] or the laminated product according to [11].

[14]

The footwear part according to [13], wherein the footwear part is a midsole, an innersole or a sole.

[15]

A method for producing a foamed product, comprising a step of foaming the ethylene copolymer composition according to any of [1] to [7].

Advantageous Effects of Invention

The present invention can provide a composition capable of allowing for production of a crosslinked foamed product suitable for applications of footwear parts such as soles and excellent in properties such as lightweight properties, heat shrinkability, compression set and mechanical strength in a well-balanced manner, a foamed product using the composition, a laminated product, and a footwear part and footwear using the same.

DESCRIPTION OF EMBODIMENTS

Hereinafter, the present invention is specifically described.

<<Ethylene Copolymer Composition>>

The ethylene copolymer composition according to the present invention includes an ethylene copolymer (A), ethylene/α-olefin having 3 to 20 carbon atoms/non-conjugated polyene copolymer rubber (B), and, if necessary, an ethylene/polar monomer copolymer (C). The ethylene copolymer composition can further include, if necessary, a foaming agent (D), a crosslinking agent (E) and any other component.

<Ethylene Copolymer (A)>

The ethylene copolymer (A) in the present invention is a copolymer including only ethylene and an α-olefin having 3 to 20 carbon atoms, preferably, a copolymer of ethylene and an α-olefin having 3 to 10 carbon atoms. In other words, the ethylene copolymer (A) in the present invention is a copolymer including a constitutional unit derived from ethylene and a constitutional unit derived from an α-olefin having 3 to 20 carbon atoms.

Examples of such an α-olefin having 3 to 20 carbon atoms, as a copolymerization component, include propylene, 1-butene, 1-pentene, 3-methyl-1-butene, 4-methyl-1-pentene, 1-hexene, 1-octene, 1-decene, 1-dodecene and 1-tetradecene. The α-olefin having 3 to 20 carbon atoms is preferably an α-olefin having 3 to 10 carbon atoms. Such an α-olefin having 3 to 20 carbon atoms, as a copolymerization component, may be adopted singly or in combinations of two or more kinds thereof.

Among these, the ethylene copolymer (A) in the present invention is particularly preferably an ethylene/1-butene copolymer.

The type of the α-olefin constituting the ethylene copolymer (A) is clear based on the type of a copolymerization monomer in production of the ethylene copolymer (A), and the type of the α-olefin in the ethylene copolymer can be identified by, for example, measuring a $^{13}$C-NMR spectrum of a sample obtained by uniformly dissolving about 200 mg of the ethylene copolymer in 1 ml of hexachlorobutadiene, in a 10-mmφ sample tube, in measurement conditions of a temperature of 120° C., a frequency of 25.05 MHz, a spectrum width of 1500 Hz, a pulse repeating time of 4.2 seconds and a 45° pulse width of 6 psec.

In the present invention, the content of the constitutional unit derived from ethylene (ethylene content) in the ethylene copolymer (A) is not particularly limited, and is usually in the range of 50 to 99% by mole, preferably 60 to 98% by mole, more preferably 75 to 97% by mole in all the constitutional units. The content of the constitutional unit derived from an α-olefin having 3 to 20 carbon atoms (α-olefin content) in the ethylene copolymer (A) is usually in the range of 1 to 50% by mole, preferably 2 to 40% by mole, more preferably 3 to 25% by mole in all the constitutional units.

The ethylene copolymer (A) in the present invention simultaneously satisfies the following requirements (A-a), (A-b), (A-c) and (A-d).
(A-a) The vinyl group content per 1,000 carbon atoms as determined by $^1$H-NMR is in the range of 0.025 to 0.3.
(A-b) The ratio $MFR_{10}/MFR_{2.16}$ is in the range of 7 to 20.
(A-c) The density is in the range of 0.850 to 0.910 g/cm$^3$.
(A-d) The melt flow rate ($MFR_{2.16}$) is in the range of 0.01 to 200 g/10 min.

Hereinafter, these respective requirements and the like are further described.

(A-a) Vinyl Group Content

The vinyl group content per 1,000 carbon atoms as determined by $^1$H-NMR in the ethylene copolymer (A) in the present invention is usually 0.025 or more, preferably 0.026 or more, more preferably 0.027 or more, still more preferably 0.028 or more, particularly preferably 0.03 or more, and usually 0.3 or less, preferably 0.2 or less, more preferably 0.15 or less, still more preferably 0.1 or less, particularly preferably 0.09 or less.

A specific method for measuring the vinyl group content (the amount of vinyl-type double bonds) is described in detail with respect to evaluation/measurement methods in Examples described below.

A vinyl group in the ethylene copolymer (A) in the present invention is usually present at an end of the copolymer. The vinyl group content per 1,000 carbon atoms in the ethylene copolymer (A) in the present invention is in the above range, and the ethylene copolymer has crosslinking ability. The vinyl group content is preferably in the above range because a molded article obtained is excellent in mechanical strength. When the vinyl group content is 0.3 or less per 1,000 carbon atoms in the ethylene copolymer (A), crosslinking and polymer main chain cleavage in heating/molding are decreased and moldability is excellent. When the vinyl group content is 0.025 or more per 1,000 carbon atoms in the ethylene copolymer (A), crosslinking is easily made and a molded article and a crosslinked foamed product are excellent in compression set (CS) and mechanical strength.

(A-b) $MFR_{10}/MFR_{2.16}$

The ratio $MFR_{10}/MFR_{2.16}$ of the ethylene copolymer (A) in the present invention is in the range of 7 to 20, preferably 7.2 to 15, more preferably 7.5 to 12. Herein, $MFR_{10}$ represents a melt flow rate (g/10 min) as measured at 190° C. and at a load of 10 kg by a method according to ASTM D1238, and $MFR_{2.16}$ represents a melt flow rate (g/10 min) as measured at 190° C. and at a load of 2.16 kg by a method according to ASTM D1238.

The ratio $MFR_{10}/MFR_{2.16}$ is a value which is considered to serve as one index representing the degree of long chain branching of the copolymer, and when the value of the ratio $MFR_{10}/MFR_{2.16}$ is in the above range, the copolymer is identified to have long chain branching. When the value of the ratio $MFR_{10}/MFR_{2.16}$ is small, the copolymer is revealed to have less long chain branching. When the value of the ratio $MFR_{10}/MFR_{2.16}$ is 7 or more, a crosslinked foamed product obtained in the case of production of a crosslinked foamed product from a composition including a large amount of the copolymer has an increased shape accuracy and the crosslinked foamed product is excellent in dimension stability. When the value of the ratio $MFR_{10}/MFR_{2.16}$ of the ethylene copolymer is 20 or less, physical properties such as strength are excellent.

(A-c) Density

The ethylene copolymer (A) in the present invention usually has a density of 0.850 g/cm$^3$ or more, preferably 0.855 g/cm$^3$ or more, more preferably 0.857 g/cm$^3$ or more, still more preferably 0.858 g/cm$^3$ or more, and usually 0.910 g/cm$^3$ or less, preferably 0.909 g/cm$^3$ or less, more preferably 0.908 g/cm$^3$ or less, still more preferably 0.907 g/cm$^3$ or less. The density of the ethylene copolymer (A) is a value as measured at 23° C. according to ASTM D1505. The density preferably satisfies such a range because a molded article or a crosslinked foamed product obtained is excellent in balance between flexibility and strength and in balance between rigidity and impact resistance strength.

(A-d) Melt Flow Rate ($MFR_{2.16}$)

The melt flow rate ($MFR_{2.16}$) of the ethylene copolymer (A) in the present invention, as measured at 190° C. and at a load of 2.16 kg by a method according to ASTM D1238, is usually 0.01 g/10 min or more, preferably 0.08 g/10 min or more, more preferably 0.05 g/10 min or more, still more preferably 0.1 g/10 min or more, particularly preferably 0.2 g/10 min, and usually 200 g/10 min or less, preferably 100 g/10 min or less, more preferably 40 g/10 min or less, still more preferably 25 g/10 min or less, particularly preferably 5 g/10 min or less.

The melt flow rate ($MFR_{2.16}$) of the ethylene copolymer (A) tends to be lower as the molecular weight is higher. The method for regulating the molecular weight is described in the section "Production of ethylene copolymer (A)". $MFR_{2.16}$ is preferably equal to or less than the upper limit from the viewpoint that a molded article obtained is enhanced in strength, and $MFR_{2.16}$ is preferably equal to or more than the lower limit from the viewpoint that the ethylene copolymer (A) is enhanced in fluidity upon melt molding.

(A-e) Mw/Mn

The molecular weight distribution (Mw/Mn) of the ethylene copolymer (A) in the present invention, as calculated as the ratio between the weight-average molecular weight Mw and the number-average molecular weight Mn determined from measurement values according to gel permeation chromatography (GPC), is not particularly limited, and is preferably 1.5 to 3.5, more preferably 1.5 to 3.0. The Mw/Mn can be in the above range by appropriately selecting a polymerization catalyst as noted in the section "Olefin polymerization catalyst". The above range is preferable from the viewpoint that melt moldability, and strength of a molded article obtained are enhanced.

(A-f) Melting Point (Tm)

The melting point (Tm) of the ethylene copolymer (A) in the present invention, as determined from an endothermic curve of DSC, is not particularly limited, and is preferably 40° C. or more, more preferably 50° C. or more, still more preferably 55° C. or more, and preferably 130° C. or less, more preferably 120° C. or less, still more preferably 110° C. or less. The melting point of the ethylene copolymer (A) is preferably in the above range from the viewpoint of the balance between rebound resilience and heat shrinkage rate.

<Method for Producing Ethylene Copolymer (A)>

The ethylene copolymer (A) in the present invention may be any one as long as it satisfies the above requirements (A-a), (A-b), (A-c) and (A-d), and can be suitably produced by copolymerizing ethylene and at least one α-olefin having 3 to 20 carbon atoms in the presence of, for example, an olefin polymerization catalyst, although the production method thereof is not particularly limited.

Olefin Polymerization Catalyst

The ethylene copolymer (A) in the present invention has properties described above, and can be produced by copolymerizing ethylene and one or more selected from an α-olefin having 3 to 20 carbon atoms in the presence of, for example, an olefin polymerization catalyst including the following catalyst components [A] and [B], although the production method thereof is not limited at all.

[A] A crosslinked metallocene compound represented by the following general formula [I]:

[Chem. 1]

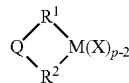
[I]

In the formula [I], M represents a transition metal, p represents the valence of the transition metal, each X may be the same or different and represents a hydrogen atom, a halogen atom or a hydrocarbon group, $R^1$ and $R^2$ may be the same or different and each represent a n-electron conjugated ligand coordinated to M, and Q represents a divalent group crosslinking $R^1$ and $R^2$.

[B] At least one compound selected from an organoaluminum oxy compound (b-1),
a compound which reacts with the metallocene compound [A] to thereby form an ion pair (b-2), and
an organoaluminum compound (b-3).

The copolymerization may be carried out, for example, by solution polymerization of ethylene and one or more kinds of monomers selected from α-olefins in the presence of such an olefin polymerization catalyst at a temperature range of from 0 to 200° C. under the coexistence of a solvent.

However, the ethylene copolymer (A) in the present invention may be produced by any method without any limitation on the above production method as long as it satisfies properties described above, and may be prepared by, for example, using a metallocene compound having a different structure from that of the formula [I] or using a co-catalyst other than the catalyst component [B], in the copolymerization, or using known two or more ethylene copolymers according to a technique such as reactor blending or physical blending.

Hereinafter, the above mentioned method for producing the ethylene copolymer (A) will further be described in which ethylene and one or more kinds selected from α-olefins having 3 to 20 carbon atoms are copolymerized in the presence of an olefin polymerization catalyst containing the catalyst components [A] and [B].

Catalyst Component [A]

The catalyst component [A] is a crosslinked metallocene compound represented by the formula [I]. In the Formula [I], examples of the transition metal represented by M include Zr, Ti, Hf, V, Nb, Ta and Cr; and preferred transition metal is Zr, Ti or Hf, and more preferred transition metal is Zr or Hf.

In the general formula [I], examples of the n-electron conjugated ligand represented by $R^1$ and $R^2$ include a ligand having an η-cyclopentadienyl structure, an η-benzene structure, an η-cycloheptatrienyl structure and an η-cyclooctatetraene structure. A ligand having an η-cyclopentadienyl structure is particularly preferred. Examples of the ligand having an η-cyclopentadienyl structure include cyclopentadienyl group, indenyl group, hydrogenated indenyl group, fluorenyl group and the like. These groups may be further substituted with a halogen atom; a hydrocarbon group such as alkyl group, aryl group, aralkyl group, alkoxy group and aryloxy group; a hydrocarbon group-containing silyl group such as a trialkyl silyl group; a chain or cyclic alkylene group; and the like.

In the general formula [I], a group crosslinking $R^1$ and $R^2$ represented by Q is not particularly limited as long as it is a divalent group. Examples thereof include linear or branched alkylene groups, unsubstituted or substituted cycloalkylene groups, alkylidene groups, unsubstituted or substituted cycloalkylidene groups, unsubstituted or substituted phenylene groups, silylene group, dialkyl-substituted silylene groups, germyl group, dialkyl-substituted germyl groups, and the like.

Specific examples of the catalyst component [A] can be a metallocene complex used in Examples described below, but not limited to such a compound at all.

The catalyst component [A] is preferably used as an olefin polymerization catalyst, together with the catalyst component [B].

Catalyst Component [B]

When the catalyst component [A] is used as a component of an olefin polymerization catalyst for producing the ethylene copolymer (A), the olefin polymerization catalyst preferably contains a catalyst component [B] constituted of at least one kind of compound selected from an organoaluminum oxy compound (b-1), a compound (b-2) forming an ion pair by reacting with the catalyst component [A] and an organoaluminum compound (b-3). Here, the catalyst component [B] is preferably used in any of the following embodiments [c1] to [c4] from the viewpoint of polymerization activity and the properties of the resulting olefin polymer:

[c1] an organoaluminum oxy compound (b-1) only,
[c2] an organoaluminum oxy compound (b-1) and an organoaluminum compound (b-3),
[c3] a compound (b-2) forming an ion pair by reacting with the catalyst component [A] and an organoaluminum compound (b-3), and
[c4] an organoaluminum oxy compound (b-1) and a compound (b-2) forming an ion pair by reacting with the catalyst component [A].

However, when a metallocene compound in which Q in the general formula [I] is a silylene group is used as the catalyst component [A], a compound (b-2) forming an ion pair by reacting with the catalyst component [A] is not used as the component [B], and only [c1] and [c2] in the above [c1] to [c4] are used as the preferred component [B].

Hereinafter, respective components capable of constituting the catalyst component [B] will be specifically described.

Organoaluminum Oxy Compound (b-1)

As the organoaluminum oxy compound (b-1), a conventionally known aluminoxane may be used as it is. Specifically, there may be mentioned a compound represented by the following general formulae [II] and/or [III]:

[Chem. 2]

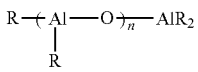

[II]

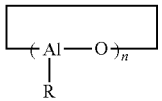

[III]

There may be mentioned a compound represented by the general formula [II] or [III] (wherein in the formula [II] or [III], R represents a hydrocarbon group having 1 to 10 carbon atoms and n represents an integer of two or more), and particularly a methylaluminoxane in which R is a methyl group and n is a number of 3 or more and preferably 10 or more is used. (Hereinafter, an organoaluminum oxy compound in which R is a methyl group in the general formula [II] or [III] may be referred to as a "methylaluminoxane".)

Further, as the organoaluminum oxy compound (b-1), a methylaluminoxane analogue which is soluble in a saturated hydrocarbon is also preferably used, and a modified methylaluminoxane represented by the following general formula [IV] may be mentioned, for example:

[Chem. 3]

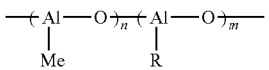

[IV]

(wherein in the formula [IV], R represents a hydrocarbon group having 2 to 20 carbon atoms, and m and n represent an integer of two or more.)

The modified methylaluminoxane represented by the general formula [IV] is prepared using trimethylaluminum and alkylaluminum other than the trimethylaluminum (for example, the production method is disclosed in U.S. Pat. Nos. 4,960,878, 5,041,584 and the like) and is commercially produced under the trade name of MMAO and TMAO in which R is an isobutyl group, which is prepared using trimethylaluminum and triisobutylaluminum by a manufacturer such as Toso Finechem Corporation and the like (for example, see "Toso Research and Technology Report" Vol. 47, 55 (2003)).

Further, as the organoaluminum oxy compound (b-1), an organoaluminum oxy compound insoluble in benzene may also be used, which is mentioned in Japanese Laid-Open Patent Publication No. H02-78687, and an organoaluminum oxy compound containing boron represented by the following general formula [V] may also be used:

[Chem. 4]

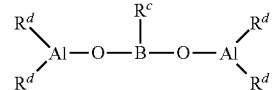

[V]

(wherein the formula [V], $R^c$ represents a hydrocarbon group having 1 to 10 carbon atoms. Rd(s) may be the same as or different from each other, and each represents a hydrogen atom, a halogen atom or a hydrocarbon group having 1 to 10 carbon atoms).

An organoaluminum compound may be slightly incorporated into the organoaluminum oxy compound (b-1).

Compound (b-2) which reacts with catalyst component [A] to thereby form ion pair Examples of the compound (b-2) (hereinafter, sometimes abbreviated as "ionic compound (b-2)") which reacts with the catalyst component [A] to thereby form an ion pair can include Lewis acid, an ionic compound, a borane compound and a carborane compound, described in, for example, Japanese Translation of PCT International Application Publication No. H1-501950, Japanese Translation of PCT International Application Publication No. H1-502036, Japanese Patent Laid-Open No. H3-179005, Japanese Patent Laid-Open No. H3-179006, Japanese Patent Laid-Open No. H3-207703, Japanese Patent Laid-Open No. H3-207704, and U.S. Pat. No. 5,321,106. Examples of the ionic compound (b-2) can also include a heteropoly compound and an isopoly compound.

In the present invention, an ionic compound (b-2) which is preferably used is a compound represented by the following general formula [VI]:

[Chem. 5]

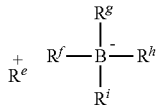

[VI]

wherein in the formula [VI], examples of $R^{e+}$ include $H^+$, a carbenium cation, an oxonium cation, an ammonium cation, a phosphonium cation, a cycloheptyltrienyl cation, a ferrocenium cation having a transition metal and the like. $R^f$ to $R^i$ may be the same or different from each other, and is an organic group, and preferably an aryl group.

Specific examples of the carbenium cation include trisubstituted carbenium cations such as triphenylcarbenium cation, tris(methylphenyl)carbenium cation, tris(dimethylphenyl)carbenium cation and the like.

Specific examples of the ammonium cation include trialkylammonium cations such as trimethylammonium cation, triethylammonium cation, tri(n-propyl)ammonium cation, triisopropylammonium cation, tri (n-butyl) ammonium cation, and triisobutylammonium cation; N,N-dialkylanilinium cations such as N,N-dimethylanilinium cation, N,N-diethylanilinium cation, and N,N-2,4,6-pentamethylanilinium cation; dialkylammonium cations such as diisopropylammonium cation and dicyclohexylammonium cation; and the like.

Specific examples of the phosphonium cation include triarylphosphonium cations such as triphenylphosphonium cation, tris(methylphenyl)phosphonium cation, and tris(dimethylphenyl)phosphonium cation; and the like.

Among those mentioned above, $R^{e+}$ is preferably a carbenium cation, an ammonium cation and the like and particularly preferably a triphenylcarbenium cation, an N,N-dimethylanilinium cation and an N,N-diethylanilinium cation.

Specific examples of the ionic compound (b-2) which is a carbenium salt include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate, tris(3,5-dimethylphenyl) carbenium tetrakis (pentafluorophenyl)borate and the like.

Examples of the ionic compound (b-2) which is an ammonium salt include a trialkyl-substituted ammonium salt, an N,N-dialkylanilinium salt, a dialkylammonium salt and the like.

Specific examples of the ionic compound (b-2) which is a trialkyl-substituted ammonium salt include triethylammonium tetraphenyl borate, tripropylammonium tetraphenyl borate, tri(n-butyl)ammonium tetraphenyl borate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis (pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, dioctadecylmethylammonium and the like.

Specific examples of the ionic compound (b-2) which an N,N-dialkyl anilinium salt include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis (pentafluorophenyl)borate, N,N-diethylanilinium tetrakis(3,5-ditrifluoromethylphenyl)borate, N,N-2,4,6-pentamethylanilinium tetraphenylborate, N,N-2,4,6-pentamethylanilinium tetrakis(pentafluorophenyl)borate and the like.

Specific examples of the dialkyl ammonium salt include di(1-propyl)ammonium tetrakis(pentafluorophenyl)borate, dicyclohexylammonium tetraphenylborate and the like.

An ionic compound disclosed by the present applicant (Japanese Patent Laid-Open No. 2004-51676) can also be used as such an ionic compound (b-2) other than the above, without any limitation.

The ionic compound (b-2) can be used singly or as a mixture of two or more kinds thereof.

Organoaluminum Compound (b-3)

Examples of the organoaluminum compound (b-3) can include an organoaluminum compound represented by the following general formula [VII], and an alkylated complex of a metal of Group 1 of the Periodic Table and aluminum, represented by the following general formula [VIII].

$$R^a_m Al(OR^b)_n H_p X_q \qquad [VII]$$

(wherein in the formula [VII], $R^a$ and $R^b$ may be the same or different from each other and each represents a hydrocarbon group having from 1 to 15 carbon atoms and preferably from 1 to 4 carbon atoms; X represents a halogen atom; and m, n, p, and q are numbers satisfying the conditions: 0<m≤3, 0≤n<3, 0≤p<3, 0≤q<3, and m+n+p+q=3).

Specific examples of the organoaluminum compound represented by the formula [VII] include tri-n-alkylaluminums such as trimethylaluminum, triethylaluminum, tri-n-butylaluminum, trihexylaluminum, and trioctylaluminum; tri-branched-chain alkylaluminums such as tri-isopropylaluminum, tri-isobutylaluminum, tri-sec-butylaluminum, tri-tert-butylaluminum, tri-2-methylbutyl aluminum, tri-3-methyl hexyl aluminum, and tri-2-ethylhexylaluminum; tri-cycloalkylaluminums such as tri-cyclohexylaluminum, and tri-cyclooctylaluminum; triarylaluminums such as triphenylaluminum and tritolylaluminum; dialkylaluminum hydrides such as diisopropylaluminum hydride and diisobutylaluminum hydride; alkenylaluminums such as isoprenylaluminum represented by the general formula: $(i-C_4H_9)_x Al_y (C_5H_{10})_z$ (wherein, x, y and z are positive integers, and z is a number satisfying the condition: $z \leq 2x$) and the like; alkylaluminum alkoxides such as isobutylaluminum methoxide and isobutylaluminum ethoxide; dialkylaluminum alkoxides such as dimethylaluminum methoxide, diethylaluminum ethoxide, and dibutylaluminum butoxide; alkylaluminum sesquialkoxides such as ethylaluminum sesquiethoxide and butylaluminum sesquibutoxide; partially alkoxylated alkylaluminums having an average composition represented by the general formula $R^a_{2.5} Al(OR^b)_{0.5}$ and the like; alkylaluminum aryloxides such as diethylaluminum phenoxide, and diethylaluminum(2,6-di-t-butyl-4-methylphenoxide); dialkylaluminum halides such as dimethylaluminum chloride, diethylaluminum chloride, dibutylaluminum chloride, diethylaluminum bromide, and diisobutylaluminum chloride; alkylaluminum sesquihalides such as ethylaluminum sesquichloride, butylaluminum sesquichloride, and ethylaluminum sesquibromide; partially halogenated alkylaluminums, for example, alkylaluminum dihalides such as ethylaluminum dichloride; dialkylaluminum hydrides such as diethylaluminum hydride and dibutylaluminum hydride; other partially hydrogenated alkylaluminums, for example, alkylaluminum dihydrides such as ethylaluminum dihydride and propylaluminum dihydride; partially alkoxylated and halogenated alkylaluminums such as ethylaluminum ethoxychloride, butylaluminum butoxychloride and ethylaluminum ethoxybromide; and the like.

$$M^2 Al R^a_4 \qquad [VIII]$$

An alkylated complex of a metal of Group 1 of the Periodic Table and aluminum, represented by the formula [VIII] (wherein in the formula [VIII], $M^2$ represents Li, Na, or K, and $R^a$ represents a hydrocarbon group having from 1 to 15 carbon atoms and preferably from 1 to 4 carbon atoms). Examples of such compounds include $LiAl(C_2H_5)_4$, $LiAl(C_7H_{15})_4$ and the like.

In addition, a compound similar to the compound represented by the formula [VII] can also be used. Examples thereof include an organoaluminum compound in which two or more aluminum compounds are bonded via a nitrogen atom. Specific examples of such a compound include $(C_2H_5)_2AlN(C_2H_5)Al(C_2H_5)_2$ and the like.

The organoaluminum compound (b-3) is preferably trimethylaluminum or triisobutylaluminum from the viewpoint of easy availability.

Production of Ethylene Copolymer (A)

The ethylene copolymer (A) in the present invention can be suitably produced by ethylene and at least one α-olefin having 3 to 20 carbon atoms in the presence of the above olefin polymerization catalyst. The copolymerization can be performed by, for example, solution polymerization in the coexistence of a solvent. The polymerization temperature is not particularly limited, and can be, for example, 140° C. or more, preferably 150° C. or more. The copolymerization reaction is preferably performed at such a temperature because the ethylene copolymer (A) obtained can be increased in ratio $MFR_{10}/MFR_{2.16}$ and also increased in vinyl group content.

When carrying out the polymerization, the method for using each of the components and the sequence of addition are selected arbitrarily. For example, a method in which the catalyst component (A) and the catalyst component (B) are added to a polymerization vessel in an arbitrary order may be mentioned.

In the above mentioned method, two or more of the respective catalyst components may be brought into contact in advance.

When the ethylene copolymer (A) in the present invention is produced by copolymerization of ethylene and at least one α-olefin having 3 to 20 carbon atoms by use of the above olefin polymerization catalyst, the catalyst component [A] is usually used in an amount of $10^{-9}$ to $10^{-1}$ mol, preferably $10^{-8}$ to $10^{-2}$ mol per liter of reaction volume.

The component (b-1) is used in an amount so that the molar ratio [(b-1)/(M)] between the component (b-1) and the entire transition metal atom (M) in the component [A] is usually from 1 to 10000, preferably 10 to 5000. The component (b-2) is used in an amount so that the molar ratio [(b-2)/(M)] thereof to the entire transition metal (M) in the component [A] is usually from 0.5 to 50, preferably 1 to 20. The component (b-3) is usually used in an amount of 0 to 5 mmol, preferably about from 0 to 2 mmol per liter of polymerization volume.

Here, the feeding molar ratio of ethylene to an α-olefin having 3 to 20 carbon atoms may be selected as appropriate depending on the properties of the intended ethylene copolymer (A). The feeding molar ratio of ethylene:α-olefin is usually from 10:90 to 99.9:0.1, preferably from 30:70 to 99.9:0.1, and more preferably from 50:50 to 95.0:5.0, but not particularly limited thereto.

Examples of the α-olefin having from 3 to 20 carbon atoms include linear or branched α-olefins, such as propylene, 1-butene, 2-butene, 1-pentene, 3-methyl-1-butene, 1-hexene, 4-methyl-1-pentene, 3-methyl-1-pentene, 1-octene, 1-decene, and 1-dodecene. Among these α-olefins, 1-butene, 1-hexene, 4-methyl-1-pentene and 1-octene are particularly preferably used. Among these, an α-olefin having 3 to 10 carbon atoms is more preferably used in the present invention.

The "solution polymerization", which is preferably employed for the production of the ethylene copolymer (A), is a general term used to refer to a method in which polymerization is carried out in a state where a polymer is dissolved in a hydrocarbon solvent that is inert to the copolymerization reaction. In the solution polymerization according to the present invention, the polymerization temperature is usually in the range of from 0 to 200° C., preferably 140° C. or higher, and more preferably 150° C. or higher.

In the solution polymerization according to the present invention, the polymerization temperature of less than 0° C. is impractical in terms of productivity, because the polymerization activity is extremely reduced. Further, there are cases where the vinyl group content of the ethylene copolymer (A) is decreased. If the polymerization temperature is within the range of from 0° C. or higher, as the temperature increases, the solution viscosity during the polymerization is decreased, the removal of the polymerization heat becomes easier, and the vinyl group content of the ethylene copolymer (A) is increased. However, if the polymerization temperature is greater than 200° C., the polymerization activity may be extremely reduced. It is preferred that the polymerization of the ethylene copolymer (A) according to the present invention be carried out at a relatively high temperature of 140° C. or higher, preferably 150° C. or higher, since the ethylene copolymer (A) has a relatively high ratio $MFR_{10}/MFR_{2.16}$ and a relatively high vinyl group content.

The polymerization pressure is usually from normal pressure to 10 MPa gauge pressure, preferably from normal pressure to 8 MPa gauge pressure, and the polymerization reaction may be carried out in any of batch, semi-continuous and continuous processes. The reaction time (average residence time, if the copolymerization reaction is carried out by a continuous process) varies depending on the conditions such as the catalyst concentration and polymerization temperature, and it may be selected as appropriate. It is usually from one minute to 3 hours and preferably from 10 minutes to 2.5 hours. Further, the polymerization may be carried out in two or more stages which have different reaction conditions. The molecular weight of the resulting ethylene copolymer (A) can be controlled by changing the hydrogen concentration or the polymerization temperature in the polymerization system, and also by changing the amount of the catalyst component (B) to be used. When hydrogen is added to the polymerization system, an appropriate amount to be added is approximately from 0.001 to 5,000 NL per 1 kg of the ethylene copolymer to be produced. In addition, the vinyl-group content of the resulting ethylene copolymer (A) can be increased by increasing the polymerization temperature and by significantly reducing the amount of hydrogen added. Further, the ratio $MFR_{10}/MFR_{2.16}$ of the resulting ethylene copolymer (A) serves as an index showing that the larger the value of the ratio, the more long chain branched structure contained in the polymer. However, in the case of coordination polymerization as shown in the Examples described later, it is considered that the long chain branched structure in the ethylene copolymer (A) is produced by reinsertion of a molecular chain (macromonomer) having a terminal vinyl group generated by the β-dehydrogenation reaction. For this reason, the value of the ratio $MFR_{10}/MFR_{2.16}$ of the ethylene copolymer (A) can be controlled by increasing or decreasing the ratio of the macromonomer concentration to the ethylene concentration ([macromonomer]/[ethylene]) in the solution. In general, if the ratio [macromonomer]/[ethylene] is high, the amount of long-chain branching in the ethylene copolymer is increased, and if the ratio [macromonomer]/[ethylene] is low, the amount of long-chain branching in the ethylene copolymer is decreased. Examples of the technique for increasing or decreasing the ratio [macromonomer]/[ethylene] in the solution include the following [1] to [4].

[1] Polymerization Temperature

The higher the polymerization temperature is, the more likely the β-dehydrogenation reaction occurs. Therefore, if the polymerization temperature is increased, the ratio [macromonomer]/[ethylene] is increased, resulting in an increase in the amount of long chain branching in the ethylene copolymer.

[2] Polymer Concentration

If the polymer concentration in the solution is increased, the macromonomer concentration is relatively increased, which leads to an increase in the ratio [macromonomer]/[ethylene], resulting in an increase in the amount of long chain branching in the ethylene copolymer.

[3] Ethylene Conversion Rate

If the ethylene conversion rate is increased, the ethylene concentration in the solution is decreased, which leads to an increase in the ratio [macromonomer]/[ethylene], resulting in an increase in the amount of long chain branching in the ethylene copolymer.

[4] Solvent Species

If a solvent having a low boiling point is used as the polymerization solvent, the ethylene concentration in the solution is decreased, which leads to an increase in the ratio [macromonomer]/[ethylene], resulting in an increase in the amount of long chain branching in the ethylene copolymer.

In addition to controlling the β-dehydrogenation reaction, the chain transfer reaction to Al and the like can also be controlled to increase and decrease the ratio [macromonomer]/[ethylene], thereby changing the amount of long chain branching in the ethylene copolymer.

The solvent used in the solution polymerization is usually an inert hydrocarbon solvent and preferably a saturated hydrocarbon solvent having a boiling point of from 50 to 200° C. under normal pressure. Specific examples of the solvent include aliphatic hydrocarbons such as pentane, hexane, heptane, octane, decane, dodecane, and kerosene; and alicyclic hydrocarbons such as cyclopentane, cyclohexane, and methylcyclopentane. Also included in the category of the "inert hydrocarbon solvents", which relates to the high temperature solution polymerization of the present invention, are aromatic hydrocarbons such as benzene, toluene and xylene; and halogenated hydrocarbons such as ethylene chloride, chlorobenzene, and dichloromethane; and the use thereof is not restricted. As described above, in the high temperature solution polymerization according to the present invention, not only an organoaluminum oxy compound which is soluble in aromatic hydrocarbons and which has been conventionally and frequently used, but also a modified methylaluminoxane such as MMAO which is soluble in aliphatic hydrocarbons and alicyclic hydrocarbons can be used. As a result, by employing an aliphatic hydrocarbon or an alicyclic hydrocarbon as a solvent for solution polymerization, the possibility that the polymerization system or the resulting ethylene copolymer is contaminated with aromatic hydrocarbons can be almost entirely eliminated. In other words, the high temperature solution polymerization method according to the present invention also has characteristics that it allows for reducing the environmental burden and minimizing the impact on human health.

In order to prevent the variations in the physical properties, it is preferred that the ethylene copolymer (A) obtained by the polymerization reaction and optionally added other components be melted, kneaded, and granulated in an arbitrary manner.

Graft Modification

A part or the whole of the ethylene copolymer (A) of the present invention may be graft modified with a polar monomer before use.

Examples of the polar monomer include hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and derivatives thereof, vinyl ester compounds, vinyl chloride, carbodiimide compounds, and the like.

As the polar monomer, an unsaturated carboxylic acid or a derivative thereof is particularly preferred. Examples of the unsaturated carboxylic acid or derivative thereof include unsaturated compounds having one or more carboxylic groups; esters of compounds having a carboxylic acid group and an alkyl alcohol; unsaturated compounds having one or more carboxylic anhydride groups, and the like. Examples of unsaturated groups include vinyl group, vinylene group, unsaturated cyclic hydrocarbon groups and the like.

Specific examples of compounds include unsaturated carboxylic acids such as acrylic acid, maleic acid, fumaric acid, tetrahydrophthalic acid, itaconic acid, citraconic acid, crotonic acid, isocrotonic acid, and nadic acid (trade mark) (endo-cis-bicyclo[2.2.1]hept-5-ene-2,3-dicarboxylic acid); or derivatives thereof such as acid halides, amides, imides, anhydrides, esters and the like. Specific examples of the derivative include malenyl chloride, maleimide, maleic anhydride, citraconic anhydride, monomethyl maleate, dimethyl maleate, glycidyl maleate and the like.

These unsaturated carboxylic acids and/or derivatives thereof may be used alone or in combination with two or more kinds. Among these, an unsaturated dicarboxylic acid or an acid anhydride thereof is suitable. Particularly, maleic acid, nadic acid or an acid anhydride thereof is preferably used.

Modification is achieved by graft polymerizing a polar monomer to a product to be modified. In the graft polymerization of such a polar monomer to the product to be modified, the polar monomer is used usually in an amount of from 1 to 100 parts by mass and preferably from 5 to 80 parts by mass based on 100 parts by mass of the product to be modified. This graft polymerization is usually performed in the presence of a radical generator.

The radical generator here used can be, for example, the same as that exemplified with respect to a radical generator (C) described below.

The radical generator can be directly mixed with a product to be modified and a polar monomer and then used, or can be used dissolved in a small amount of an organic solvent and then used. The organic solvent can be used without any particular limitation as long as it is an organic solvent which can dissolve the radical generator.

In the graft polymerization of a polar monomer to the product to be modified, a reducing substance may be used. If a reducing substance is used, the grafted amount of the polar monomer can be increased. The graft modification of the product to be modified with a polar monomer can be performed by a conventionally known method.

The modified amount (the grafted amount of the polar monomer) of the modified product thus obtained is usually in the range of from 0.1 to 50% by mass, preferably from 0.2 to 30% by mass and more preferably from 0.2 to 10% by mass, based on 100% by mass of the modified product.

When the ethylene copolymer (A) of the present invention is used after graft modifying a part or the whole thereof with a polar monomer, the resulting copolymer has an excellent adhesiveness to other resins and excellent compatibility, and the wettability of the surface of the resulting molded article may be improved.

Further, if the content of the polar monomer such as an unsaturated carboxylic acid and/or a derivative thereof is within the above range, when the ethylene copolymer (A) of the present invention is used after graft modifying a part of or the whole thereof, the resulting copolymer has a high adhesive strength to a polar group-containing resin (such as polyester, polyvinyl alcohol, ethylene/vinyl alcohol copolymer, polyamide, PMMA, polycarbonate and the like).

In addition, other polymers such as a thermoplastic resin or an elastomer can be blended to a graft-modified ethylene copolymer (A) obtained by graft modifying a part or the whole of the ethylene copolymer (A) of the present invention, to the extent that the properties of the modified product are not impaired. They may be blended during the graft-modifying stage or after the modification.

<Ethylene/α-Olefin Having 3 to 20 Carbon Atoms/Non-Conjugated Polyene Copolymer Rubber (B)>

The ethylene/α-olefin having 3 to 20 carbon atoms/non-conjugated polyene copolymer rubber (B) in the present invention is elastic random copolymer rubber including ethylene, an α-olefin having 3 to 20 carbon atoms and non-conjugated polyene as constituent components, which is amorphous or has a low crystallinity. The ethylene/α-olefin having 3 to 20 carbon atoms/non-conjugated polyene copolymer rubber (B) (hereinafter, also simply referred to as "component (B)") here used is suitably one which usually has a degree of crystallization of less than 10% as determined by a known wide-angle X-ray diffraction method.

The content of a constitutional unit derived from ethylene in the component (B) is preferably 50% by mass or more, more preferably 52% by mass or more, still more preferably 55% by mass or more, particularly preferably 60% by mass or more, and preferably 95% by mass or less, more preferably 85% by mass or less, still more preferably 83% by mass or less, particularly preferably 80% by mass or less (wherein the total of the constitutional unit derived from ethylene, the constitutional unit derived from an α-olefin having 3 to 20 carbon atoms and the constitutional unit derived from a non-conjugated polyene is 100% by mass). The mass ratio between the constitutional unit derived from ethylene and the constitutional unit derived from the α-olefin in the component (B) is not particularly limited, and is, for example, usually in the range of 55/45 to 85/15, in particular, preferably in the range of 60/40 to 83/17. A requirement (B-a) where the constitutional unit derived from ethylene in the component (B) is in a preferable range, particularly in the range of 60 to 95% by mass is preferably satisfied, because a molded article or a foamed product obtained from the ethylene copolymer composition of the present invention is low in heat shrinkage rate and excellent in mechanical properties.

Examples of the α-olefin having from 3 to 20 carbon atoms include linear or branched α-olefins, such as propylene, 1-butene, 2-butene, 1-pentene, 3-methyl-1-butene, 1-hexene, 4-methyl-1-pentene, 3-methyl-1-pentene, 1-octene, 1-decene, and 1-dodecene. Among these α-olefins, 1-butene, 1-hexene, 4-methyl-1-pentene and 1-octene are particularly preferably used. Among these, an α-olefin having 3 to 10 carbon atoms is more preferably used in the present invention.

Specific examples of the non-conjugated polyene include dicyclopentadiene, 1,4-hexadiene, cyclooctadiene, methylene norbornene, ethylidene norbornene and vinylnorbornene. The content of the constitutional unit derived from the non-conjugated polyene in the component (B) is usually 0.01% by mass or more, preferably 0.1% by mass or more, more preferably 0.11% by mass or more, and usually 30% by mass or less, preferably 20% by mass or less, more preferably 10% by mass or less. Herein, the total of the constitutional unit derived from ethylene, the constitutional unit derived from an α-olefin having 3 to 20 carbon atoms and the constitutional unit derived from the non-conjugated polyene is 100% by mass.

The component (B) in the present invention is, in particular, preferably ethylene/propylene/non-conjugated diene copolymer rubber or ethylene/1-butene/non-conjugated diene copolymer rubber, and in particular, ethylene/propylene/non-conjugated diene copolymer rubber, in particular, ethylene/propylene/ethylidene norbornene copolymer rubber or ethylene/propylene/vinylnorbornene copolymer rubber is particularly suitably used because the ethylene copolymer composition can form a proper crosslinked structure. The component (B) for use in the present invention is particularly preferably ethylene/propylene/ethylidene norbornene copolymer rubber.

In the present invention, the non-conjugated polyene component constituting the component (B) may be the above non-conjugated polyene, and, for example, the non-conjugated diene may be used singly or as a mixture of two or more kinds thereof. Not only the above non-conjugated polyene, but also other copolymerizable monomers may be used as long as the effect of the present invention is not impaired.

In the present invention, the content of the non-conjugated polyene constituting the component (B), for example, non-conjugated diene is desirably in the range of 0.01 to 30% by mass, preferably 0.1 to 20% by mass, particularly preferably 0.1 to 10% by mass.

Examples of the component (B) for use in the present invention include an ethylene/α-olefin having 3 to 20 carbon atoms/non-conjugated polyene copolymer where the ethylene/α-olefin having 3 or more carbon atoms (mass ratio) as the ratio between ethylene and the α-olefin having 3 or more carbon atoms is 40/60 to 95/5.

The intrinsic viscosity [η] of the component (B) for use in the present invention, as measured in a decalin solvent at 135° C. is usually in the range of 1.0 to 10.0 dl/g, preferably 1.5 to 7 dl/g. The component (B) for use in the present invention has a no melting point (Tm) or a melting point of less than 120° C. as determined from an endothermic curve of DSC, without any particular limitation.

The Mooney viscosity ($ML_{1+4}$) at 100° C., namely, the Mooney viscosity ($ML_{1+4}$) as measured at 100° C. by a method according to JIS K6395, of the component (B) for use in the present invention is desirably preferably 10 or more, more preferably 30 or more, still more preferably 45 or more, particularly preferably 50 or more, and preferably 300 or less, more preferably 200 or less, still more preferably 150 or less, particularly preferably 120 or less. The component (B) preferably satisfies in particular a requirement (B-b) where the Mooney viscosity ($ML_{1+4}$) at 100° C. is in the range of 50 to 120. The Mooney viscosity ($ML_{1+4}$) of the component (B) is preferably equal to or more than the lower limit, in particular, 50 or more because a molded article or a foamed product obtained from the ethylene copolymer composition of the present invention is low in heat shrinkage rate and excellent in mechanical properties, and the Mooney viscosity ($ML_{1+4}$) of the component (B) is preferably equal to or less than the upper limit, in particular, 120 or less because an ethylene copolymer composition obtained is favorable in fluidity upon melt molding.

In the present invention, the component (B) preferably satisfies at least one requirement of the requirements (B-a) and (B-b), more preferably any one thereof.

(B-a) The content of the constitutional unit derived from ethylene is in the range of 60 to 95% by mass.

(B-b) The Mooney viscosity ($ML_{1+4}$) as measured at 100° C. by a method according to JIS K6395 is in the range of 50 to 120.

The iodine value of the component (B) is preferably in the range of 3 to 30, particularly preferably in the range of 5 to 25. The iodine value of the component (B) is preferably in such a range because an ethylene copolymer composition obtained is crosslinked in a well-balanced manner to provide an article excellent in moldability and rubber elasticity.

In the present invention, the component (B) is obtained by, for example, copolymerizing ethylene, the α-olefin having 3 to 20 carbon atoms and the non-conjugated polyene in the presence of an olefin polymerization catalyst. The α-olefin and the non-conjugated polyene constituting the component (B) may be each used singly or in combinations of two or more kinds thereof.

The content of the component (B) in the ethylene copolymer composition of the present invention is not particularly limited, and the mass ratio [(A)/(B)] between the component (B) and the ethylene copolymer (A) (component (A)) is usually from 1/99 to 95/5, the lower limit is preferably 2/98, the lower limit is more preferably 4/96, the lower limit is still more preferably 5/95, the lower limit is particularly preferably 10/90, and the upper limit is preferably 80/20, the upper limit is more preferably 75/25, the upper limit is still more preferably 39/61, the upper limit is particularly preferably in the range of 30/70. When the component (B) satisfies at least one requirement of the above requirements (B-a) and (B-b), the mass ratio [(A)/(B)] between the component (A) and the component (B) preferably satisfies from 5/95 to 30/70. The compounding ratio between the component (A) and the component (B) preferably satisfies the range because the balance among rebound resilience, heat shrinkage and mechanical properties is excellent.

<Ethylene/Polar Monomer Copolymer (C)>

The ethylene copolymer composition of the present invention may contain, if necessary, an ethylene/polar monomer copolymer (C), preferably contains an ethylene/polar monomer copolymer (C).

Examples of the polar monomer of the ethylene/polar monomer copolymer (C) in the present invention can include unsaturated carboxylic acids, salts thereof, esters thereof, amides thereof and vinyl esters thereof, and carbon monoxide. More specific examples can include one or more of unsaturated carboxylic acids such as acrylic acid, methacrylic acid, fumaric acid, itaconic acid, monomethyl maleate, monoethyl maleate, maleic anhydride and itaconic anhydride, salts of these unsaturated carboxylic acids and monovalent metals such as lithium, sodium and potassium and salts of these unsaturated carboxylic acids and polyvalent metals such as magnesium, calcium and zinc, unsaturated carboxylic acid esters such as methyl acrylate, ethyl acrylate, isopropyl acrylate, isobutyl acrylate, n-butyl acrylate, isooctyl acrylate, methyl methacrylate, ethyl methacrylate, isobutyl methacrylate and dimethyl maleate, vinyl esters such as vinyl acetate and vinyl propionate, carbon monoxide, and sulfur dioxide.

More specific representative examples of the ethylene/polar monomer copolymer (C) can include ethylene/unsaturated carboxylic acid copolymers such as an ethylene/acrylic acid copolymer and an ethylene/methacrylic acid copolymer, ionomers in which some or all carboxyl groups of such an ethylene/unsaturated carboxylic acid copolymer are neutralized by the above metals, ethylene/unsaturated carboxylic acid ester copolymers such as an ethylene/methyl acrylate copolymer, an ethylene/ethyl acrylate copolymer, an ethylene/methyl methacrylate copolymer, an ethylene/isobutyl acrylate copolymer and an ethylene/n-butyl acrylate copolymer, ethylene/unsaturated carboxylic acid ester/unsaturated carboxylic acid copolymers such as an ethylene/isobutyl acrylate/methacrylic acid copolymer and an ethylene/n-butyl acrylate/methacrylic acid copolymer, ionomers in which some or all carboxyl groups are neutralized by the above metals, and ethylene/vinyl ester copolymers such as an ethylene/vinyl acetate copolymer.

Among these, in particular, a copolymer of ethylene and a polar monomer selected from an unsaturated carboxylic acid, a salt thereof, an ester thereof and vinyl acetate is preferable, an ethylene/(meth)acrylic acid copolymer or an ionomer thereof, an ethylene/(meth)acrylic acid/(meth)acrylic acid ester copolymer or an ionomer thereof, or an ethylene/vinyl acetate copolymer is preferable, and an ethylene/vinyl acetate copolymer is most preferable from the viewpoints of flexibility, adhesiveness and cost.

The ethylene/polar monomer copolymer (C) usually preferably has a polar monomer content of 1 to 50% by mass, particularly 5 to 45% by mass, while the content is different depending on the type of the polar monomer. The ethylene/polar monomer copolymer here used preferably has a melt flow rate of 0.05 to 500 g/10 min, particularly 0.1 to 100 g/10 min at 190° C. and at a load of 2.16 kg, in consideration of moldability, mechanical strength and the like. A copolymer of ethylene and an unsaturated carboxylic acid, an unsaturated carboxylic acid ester, vinyl ester or the like can be obtained by radical copolymerization at a high temperature and a high pressure. A copolymer (ionomer) of ethylene and a metal salt of an unsaturated carboxylic acid can be obtained by reacting an ethylene/unsaturated carboxylic acid copolymer with a corresponding metal compound.

When the ethylene/polar monomer copolymer (C) in the present invention is an ethylene/vinyl acetate copolymer, the vinyl acetate content in the ethylene/vinyl acetate copolymer is usually 10 to 30% by mass, preferably 15 to 30% by mass, still more preferably 15 to 25% by mass.

The ethylene/vinyl acetate copolymer preferably has a melt flow rate (MFR; ASTM D1238, 190° C., load 2.16 kg) of 0.1 g/10 min or more, more preferably 0.3 g/10 min or more, still more preferably 0.5 g/10 min or more, and preferably 50 g/10 min or less, more preferably 20 g/10 min or less, still more preferably 5 g/10 min or less.

The ethylene/polar monomer copolymer (C), which is an optional component in the ethylene copolymer composition of the present invention, is also preferably formed into a laminated product when adopted, because a foamed product layer obtained is excellent in adhesiveness to other layers including polyurethane, rubber, leather or the like.

In particular, in a case where the ethylene/polar monomer copolymer (C) is a copolymer of ethylene and an unsaturated carboxylic acid, these components can be used at the above ratio to thereby obtain a composition capable of providing a crosslinked foamed product excellent in tear strength properties and adhesiveness to other layers including polyurethane, rubber, leather or the like.

The content of the ethylene/polar monomer copolymer (C) (component (C)) in the ethylene copolymer composition of the present invention is not particularly limited, and the mass ratio [(A)/(C)] between the ethylene copolymer (A) (component (A)) and the component (C) is preferably in the range of 1/99 to 39/61, more preferably 1/99 to 29/71, still more preferably 1/99 to 19/81. The compounding ratio between the component (A) and the component (C) preferably satisfies the range because excellent moldability is achieved.

<Foaming Agent (D)>

The ethylene copolymer composition of the present invention may contain, if necessary, a foaming agent (D). The ethylene copolymer composition containing the foaming agent (D) is suitably used for production of a foamed product and a crosslinked foamed product.

When the ethylene copolymer composition of the present invention contains the foaming agent (D), the content of the foaming agent (D) depends on the type of the foaming agent (D), and is desirably preferably in the range of 0.1 to 30 parts by mass, more preferably 0.1 to 25 parts by mass, still more preferably 0.5 to 20 parts by mass based on 100 parts by mass in total (namely, 100 parts by mass of all the resin components) of the ethylene copolymer (A), the ethylene/α-olefin having 3 to 20 carbon atoms/non-conjugated polyene copolymer rubber (B) and, if necessary, the ethylene/polar monomer copolymer (C), and other resin components.

In the present invention, any of a chemical foaming agent and a physical foaming agent can be used as the foaming agent (D).

Specific examples of the chemical foaming agent include azo compounds such as
azodicarbonamide (ADCA),
1,1'-azobis(1-acetoxy-1-phenylethane),
dimethyl-2,2'-azobisbutylate,
dimethyl-2,2'-azobisisobutylate,
2,2'-azobis(2,4,4-trimethylpentane),
1,1'-azobis(cyclohexane-1-carbonitrile) and
2,2'-azobis[N-(2-carboxyethyl)-2-methyl-propioneamidine];
nitroso compounds such as N,N'-dinitrosopentamethylenetetramine (DPT);
hydrazine derivatives such as 4,4'-oxybis(benzene-sulfonylhydrazide) and
diphenylsulfone-3,3'-disulfonylhydrazide;
semicarbazide compounds such as p-toluenesulfonyl semicarbazide;
organic thermally decomposable foaming agents such as trihydrazinotriazine, as well as
bicarbonates such as sodium hydrogen carbonate and ammonium hydrogen carbonate, carbonates such as sodium carbonate and ammonium carbonate;
nitrites such as ammonium nitrite, and
inorganic thermally decomposable foaming agents such as a hydrogen compound. Among these, azodicarbonamide (ADCA) and sodium hydrogen carbonate are particularly preferable.

Further, examples of the physical foaming agent, which is a foaming agent not necessarily accompanied by chemical reactions upon foaming, include organic physical foaming agents including various kinds of aliphatic hydrocarbons such as methanol, ethanol, propane, butane, pentane, and hexane; various kinds of chlorinated hydrocarbons such as dichloroethane, dichloromethane, and carbon tetrachloride; various kinds of fluorochlorohydrocarbons such as chlorofluorocarbon; and inorganic physical foaming agents such as air, carbon dioxide, nitrogen, argon, and water; and the like. Among these, carbon dioxide, nitrogen and argon are the most excellent because they do not need to be turned into vapor, and is inexpensive and most unlikely to cause environmental pollution and ignition.

If the physical foaming agent is used as the foaming agent (D) in the present invention, no decomposition residue of the foaming agent is left, thereby preventing the fouling of the mold during the crosslinking forming process of the composition. Moreover, the physical foaming agent is excellent in kneadability, since it is not in a powder form. In addition, the use of the physical foaming agent allows for preventing the foul odor of the resulting foamed product (such as an ammonia odor generated upon decomposition of ADCA).

Further, in the present invention, the chemical foaming agent as described above may be used as the foaming agent (D) as long as it causes no adverse effect such as odor and mold fouling. The chemical foaming agent may be used alone or in combination with two or more kinds. A physical foaming agent and a chemical foaming agent may be used in combination.

In the case of small-scale production, the physical foaming agent such as carbon dioxide or nitrogen can be stored in a gas cylinder, and it may be supplied to an injection molding machine, extrusion molding machine and the like through a pressure reducing valve, or it may be pressurized by a pump or the like and then supplied to an injection molding machine, extrusion molding machine and the like.

In the case of large-scale production in a facility therefor, liquefied carbon dioxide, liquefied nitrogen and the like stored in a storage tank is vaporized by passing through a heat exchanger and supplied to an injection molding machine, an extrusion molding machine and the like through piping and a pressure reducing valve.

In the case of a physical foaming agent in a liquid state, the storage pressure is preferably in the range of 0.13 to 100 MPa.

When a chemical foaming agent is used as the foaming agent (D), the chemical foaming agent is preferably used in a proportion of 2 to 30 parts by mass, more preferably 3 to 20 parts by mass, still more preferably 5 to 15 parts by mass, based on 100 parts by mass in total (namely, 100 parts by mass of all the resin components) of the ethylene copolymer (A), the ethylene/α-olefin having 3 to 20 carbon atoms/non-conjugated polyene copolymer rubber (B) and, if necessary, the ethylene/polar monomer copolymer (C), and other resin components. Herein, the amount of the chemical foaming agent used can be appropriately increased or decreased depending on the intended expansion ratio because the volume of the gas generated differs depending on the type and grade of the foaming agent used.

When a physical foaming agent is used as the foaming agent (D), the amount of the physical foaming agent added is appropriately determined depending on a desired expansion ratio, and is preferably 0.1 to 15 parts by mass, more preferably 0.5 to 10 parts by mass based on 100 parts by mass in total (namely, 100 parts by mass of all the resin components) of the ethylene copolymer (A), the ethylene/α-olefin having 3 to 20 carbon atoms/non-conjugated polyene copolymer rubber (B) and, if necessary, the ethylene/polar monomer copolymer (C), and other resin components.

The ethylene copolymer composition of the present invention may contain, if necessary, an auxiliary foaming agent together with the foaming agent (D). The auxiliary foaming agent functions to, for example, lower the decomposition temperature of the foaming agent (D), promote decomposition and uniform bubbles. Examples of such an auxiliary foaming agent include zinc oxide (ZnO), zinc stearate, organic acids such as salicylic acid, phthalic acid, stearic acid and oxalic acid, and urea and derivatives thereof.

<Crosslinking Agent (E)>

The ethylene copolymer composition of the present invention may contain, if necessary, a crosslinking agent (E). The ethylene copolymer composition containing the crosslinking agent (E) is suitably used for production of a crosslinked molded article and a crosslinked foamed product.

A radical generator serving as a crosslinking agent can be used as the crosslinking agent (E) without any particular limitation.

When the ethylene copolymer composition of the present invention contains the crosslinking agent (E), the content is appropriately determined depending on properties of the resin component and a desired degree of crosslinking, and is desirably preferably in the range of 0.1 to 2.0 parts by mass, more preferably 0.3 to 1.8 parts by mass, still more preferably 0.6 to 1.6 parts by mass based on 100 parts by mass in total (namely, 100 parts by mass of all the resin components) of the ethylene copolymer (A), the ethylene/α-olefin having 3 to 20 carbon atoms/non-conjugated polyene copolymer rubber (B) and, if necessary, the ethylene/polar monomer copolymer (C), and other resin components. When the ethylene copolymer composition containing the crosslinking agent (E) in such an amount is used, a molded article or a foamed molded article having an appropriate crosslinked structure can be produced.

An organic peroxide is preferably used as the crosslinking agent (E), and specific examples include organic peroxides such as
dicumyl peroxide,
di-t-butyl peroxide,
2,5-dimethyl-2,5-di-(t-butylperoxy)hexane,
2,5-dimethyl-2,5-di-(t-butylperoxy)hexine-3,
1,3-bis(t-butylperoxyisopropyl)benzene,
1,1-bis(t-butylperoxy)-3,3,5-trimethylcyclohexane,
n-butyl-4,4-bis(t-butylperoxy)varelate,
benzoyl peroxide,
p-chlorobenzoyl peroxide,
2,4-dichlorobenzoyl peroxide,
t-butylperoxy benzoate,
t-butyl perbenzoate,
t-butylperoxyisopropyl carbonate,
diacetyl peroxide,
lauroyl peroxide and
t-butylcumyl peroxide. Among these, dicumyl peroxide is preferable.

<Auxiliary Crosslinking Agent (F)>

When the ethylene copolymer composition of the present invention contains the crosslinking agent (E), the composition also preferably contains, if necessary, an auxiliary crosslinking agent (F), together with the crosslinking agent (E). Examples of the auxiliary crosslinking agent (F) include sulfur, peroxy auxiliary crosslinking agents such as p-quinonedioxime, p,p'-dibenzoylquinonedioxime, N-methyl-N-4-dinitrosoaniline, nitrosobenzene, diphenylguanidine and trimethylolpropane-N,N'-m-phenylenedimaleimide; or divinyl benzene, triallyl cyanurate (TAC) and triallyl isocyanurate (TRIC).

Examples of the auxiliary crosslinking agent (F) include multifunctional methacrylate monomers such as ethylene glycol dimethacrylate, diethylene glycol dimethacrylate, polyethylene glycol dimethacrylate, trimethylolpropane trimethacrylate and allyl methacrylate: and multifunctional vinyl monomers such as vinyl butyrate and vinyl stearate. Among these, triallyl cyanurate (TAC) and triallyl isocyanurate (TRIC) are preferable.

Such an auxiliary crosslinking agent in the ethylene copolymer composition of the present invention is desirably used in an amount so that the mass ratio [auxiliary crosslinking agent (F)/crosslinking agent (E)] between the auxiliary crosslinking agent (F) and the crosslinking agent (E) is preferably 1/30 to 5/1, more preferably 1/20 to 3/1, still more preferably 1/15 to 2/1, particularly preferably 1/10 to 1/1.

<Optional Component>

The ethylene copolymer composition of the present invention may contain, if necessary, any component other than the above components, as an optional component, as long as the objects of the present invention are not impaired, and may contain, for example, various additives such as a filler, a heat stabilizer, a weathering stabilizer, a flame retardant, a hydrochloric acid absorbent and a pigment, and any resin component other than the above components (A) to (C). Examples of such various additives include known additives which can be added to an olefinic resin.

<<Preparation of Ethylene Copolymer Composition>>

The ethylene copolymer composition of the present invention can be prepared by sequentially or simultaneously mixing the above components by a known method. The ethylene copolymer composition of the present invention is preferably in the form of, for example, a pellet or a sheet.

A pellet of the ethylene copolymer composition of the present invention can be prepared by mixing the ethylene copolymer (A), the ethylene/α-olefin having 3 to 20 carbon atoms/non-conjugated polyene copolymer rubber (B) and, if necessary, the ethylene/polar monomer copolymer (C), the foaming agent (D), the crosslinking agent (E), the auxiliary crosslinking agent (F) and an optional component such as an additive in the above proportions by a Henschel mixer or the like, melt-plasticizing the mixture by a kneader such as a Banbury mixer, a roll or an extruder at a temperature at which the foaming agent (D) and the crosslinking agent (E) are not decomposed, homogeneously mixing and dispersing the resultant, and pelletizing the resultant by a granulator. Examples of the method for crosslinking and foaming include crosslinking by heat treatment and ionizing radiation crosslinking, as described below. In the case of crosslinking by heat treatment, the composition preferably contains the crosslinking agent (E) and the auxiliary crosslinking agent (F). In the case of crosslinking by ionizing radiation, the auxiliary crosslinking agent (F) may be compounded.

A sheet of the ethylene copolymer composition of the present invention can be prepared from, for example, the pellet obtained as described above by using an extruder or a calender molding machine. Alternatively, a foamable sheet in a non-crosslinked and unfoamed state can be prepared by a method involving kneading the components constituting the ethylene copolymer composition by a Brabender or the like and then molding the kneaded product into a form of sheet by a calender roll, a method involving molding the kneaded product into a form of sheet by a press molding machine, or a method involving kneading the components by using an extruder and then molding the kneaded product into a form of sheet through a T-die or a cyclic die.

The ethylene copolymer composition of the present invention can be used in various molding applications such as injection molding and foaming molding, and can be suitably used in production of a crosslinked product or a crosslinked foamed product.

<<Production of Foamed Product>>

In the present invention, a foamed product such as a crosslinked foamed product can be produced using the ethylene copolymer composition of the present invention.

An ethylene copolymer composition containing the foaming agent (D), the crosslinking agent (E) or a combination thereof is suitably used in production of the foamed product.

The ethylene copolymer composition for use in production of the foamed product is in a non-crosslinked and unfoamed state, and may be in a molten state or may be in the form of a pellet or sheet cooled and solidified.

The foamed product of the present invention (non-crosslinked or crosslinked foamed product), although the production method thereof is not particularly limited, can be prepared by, for example, the following method.

For example, a sheet formed from the ethylene copolymer composition of the present invention can be obtained by using a calender molding machine, a press molding machine or a T-die extruder. When the sheet is formed, the sheet is preferably formed at a temperature equal to or less than the decomposition temperatures of the foaming agent (D) and the crosslinking agent (E) such as organic peroxide, and the sheet is specifically preferably formed in a temperature condition where the resin components are molten, for example, at 100 to 130° C.

A primary foamed product is produced from the sheet including the ethylene copolymer composition by a method involving, for example, cutting the sheet to a volume of 1.0 to 1.2 times the volume of a mold maintained at 130 to 200° C. and placing it into the mold, and producing a primary foamed product (non-crosslinked or crosslinked foamed product) in conditions of a clamping pressure of the mold, for example, of 30 to 300 kgf/cm$^2$ and a holding time of, for example, 10 to 90 minutes. In other words, the foamed product (non-crosslinked or crosslinked foamed product) is produced by heat treatment. The holding time depends on the thickness of the mold, and thus can be appropriately increased or decreased beyond the range.

The shape of the mold used for producing the above mentioned (crosslinked) foamed product is not particularly limited, but a mold having a shape suitable for producing sheets is usually used. The mold preferably has a completely closed structure so that the melted resin and the gas generated during the decomposition of the foaming agent may not escape. Further, the mold form preferably has a tapered inner surface, from the viewpoint of the releasability of the resin.

The foamed product of the present invention can also be produced by an extrusion foaming method involving extruding the ethylene copolymer composition from an extruder, and releasing the composition into the atmosphere and foaming it at the same time, other than the above method. In other words, the foamed product can be produced by heat treatment.

Examples can also include a method involving injecting the ethylene copolymer composition at a temperature equal to or less than the decomposition temperatures of the foaming agent (D) and the crosslinking agent (E), into a mold, and crosslinking and foaming the resultant maintained at a temperature of, for example, about 130° C. to 200° C. in the mold (injection foaming method). In other words, the foamed product can be produced by heat treatment.

A predetermined shape can be given to the foamed product obtained by the above method, by compression molding. Examples of the compression molding conditions here include a mold temperature in the range of 130 to 200° C., a clamping pressure in the range of 30 to 300 kgf/cm$^2$, a compression time in the range of 5 to 60 minutes, and a compression ratio in the range of 1.1 to 3.0, preferably 1.3 to 2.

In order that a crosslinked foamed product is obtained according to a crosslinking method by irradiation with ionizing radiation, a sheet-shaped crosslinked foamed product can be obtained by, for example, melting and kneading an ethylene copolymer composition containing the foaming agent (D) as an organic thermally decomposable foaming agent, at a temperature less than the decomposition temperature of the organic thermally decomposable foaming agent, molding the kneaded product obtained, into, for example, a form of sheet to thereby obtain a sheet-shaped foamed product, then irradiating the sheet-shaped foamed product obtained, with a determined dose of ionizing radiation to thereby crosslink the sheet-shaped foamed product, and then heating and foaming the sheet-shaped crosslinked foamed product obtained, at a temperature equal to or more than the decomposition temperature of the organic thermally decomposable foaming agent. In other words, the foamed product can be produced by heat treatment. The ionizing radiation here used is, for example, α-ray, β-ray, γ-ray, electron beam, neutron beam or X-ray. Among these, γ-ray of cobalt-60, or electron beam is preferably used.

Examples of the shape of the foamed product include a sheet shape, a thick board shape, a net shape and a molded shape.

A secondary foamed product can be produced by giving a predetermined shape to the crosslinked foamed product obtained by the above method, by compression molding. Examples of the compression molding conditions here include a mold temperature in the range of 130 to 200° C., a clamping pressure in the range of 30 to 300 kgf/cm$^2$, a compression time in the range of 5 to 60 minutes, and a compression ratio in the range of 1.1 to 3.0.

Among the above production methods, it is preferable to obtain the foamed product by heat treatment of the ethylene copolymer composition. The foamed product according to the present invention is preferably a crosslinked foamed product.

The foamed product of the present invention, obtained by foaming the ethylene copolymer composition according to the present invention, preferably has a specific gravity of 0.03 to 0.30. The foamed product is also preferably used in a laminated product, footwear or a footwear part, described below.

<<Laminated Product>>

The laminated product of the present invention is a laminated product having a layer including the foamed product of the present invention and a layer including one or more raw materials selected from the group consisting of polyolefin, polyurethane, rubber, leather and artificial leather.

The above polyolefin, polyurethane, rubber, leather and artificial leather are not particularly limited, and conventionally known polyolefin, polyurethane, rubber, leather and artificial leather can be used. The laminated product is suitable particularly for an application of footwear or a footwear part.

<<Footwear and Footwear Part>>

The footwear or footwear part of the present invention is obtained by using the above foamed product or laminated product of the present invention. Examples of the footwear part include shoe soles, shoe midsoles, innersoles, soles and sandals. Since the footwear or the footwear part according to the present invention is obtained using the foamed product or laminated product of the present invention, it is lightweight, and the deformation thereof due to long-term use can be prevented.

EXAMPLES

Hereinafter, the present invention is further specifically described based on Examples, but the present invention is not limited to these Examples.

In the following Examples and Comparative Examples, various physical properties were measured or evaluated as follows.

[Evaluation of Physical Properties of Copolymer]

Amount of Double Bonds

The amount of double bonds was determined by $^1$H-NMR measurement ("ECX400P nuclear magnetic resonance spectrometer" manufactured by JEOL Ltd.) of the ethylene/α-olefin copolymer. Herein, vinyl-type double bonds, vinylidene-type double bonds, 2-substituted olefin-type double bonds and 3-substituted olefin-type double bonds are observed as signals derived from double bonds. The amount of double bonds was determined from the integrated intensity of each of the signals. The signal of methylene in the main chain of the ethylene/α-olefin copolymer was used as the chemical shift reference (1.2 ppm).

[Chem. 6]

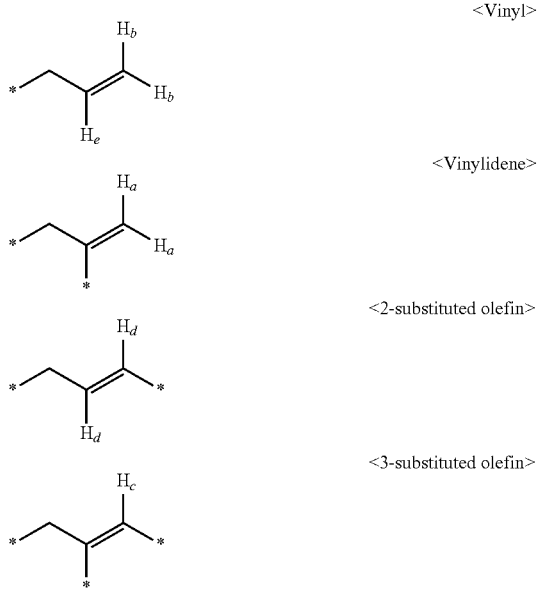

In each of the above formulae, * represents a bond to an atom other than hydrogen atom.

Each peak of hydrogen atoms a to e is observed in the vicinity of the following.

Peak of hydrogen atom a: 4.60 ppm
Peak of hydrogen atom b: 4.85 ppm
Peak of hydrogen atom c: 5.10 ppm
Peak of hydrogen atom d: 5.25 ppm
Peak of hydrogen atom e: 5.70 ppm The equations for determining the amounts of double bonds are as follows.

Amount of vinyl-type double bonds={(Integrated intensity of signal b)+(Integrated intensity of signal e)}/3

Amount of vinylidene-type double bonds=(Integrated intensity of signal a)/2

Amount of 2-substituted olefin-type double bonds=(Integrated intensity of signal d)/2

Amount of 3-substituted olefin-type double bonds=(Integrated intensity of signal c)

The vinyl group content (amount of vinyl-type double bonds) per 1,000 carbon atoms (1000C) was determined from these results.

Density d

The density d (kg/m$^3$) was determined at 23° C. according to ASTM D1505.

MFR

The MFR (melt flow rate, g/10 min) was determined at 190° C. according to ASTM D1238. The measurement value at a load of 2.16 kg was defined as $MFR_{2.16}$, and the measurement value at a load of 10 kg was defined as $MFR_{10}$.

Molecular Weight Distribution (Mw/Mn)

The Mw/Mn was determined by gel permeation chromatography (GPC) at 140° C. with an o-dichlorobenzene solvent. The measurement was made as follows, using Gel Permeation Chromatography Alliance GPC-2000 Model manufactured by Waters Corporation. Two separation columns of TSK gel GNH6-HT and two separation columns of TSK gel GNH6-HTL, each having a column size of a diameter of 7.5 mm and a length of 300 mm, were used, the column temperature was 140° C., o-dichlorobenzene (Wako Pure Chemical Industries, Ltd.) was used in a mobile phase, 0.025% by mass of BHT (Takeda Pharmaceutical Company Limited) was used as an antioxidant, movement was made at 1.0 ml/min, the sample concentration was 15 mg/10 ml, the volume of sample injection was 500 μl, and a differential refractometer was used as a detector. Standard polystyrene having a molecular weight of Mw<1000 or Mw>4×10$^6$, manufactured by Tosoh Corporation, was used, and one having 1000 Mw 4×10$^6$, manufactured by Pressure Chemical Co., Ltd., was used.

Melting Point (Tm)

About 5.0 mg of a sample was heated from 30° C. to 200° C. at a rate of temperature rise of 10° C./min and retained at that temperature for 10 minutes under a nitrogen atmosphere with a differential scanning calorimeter [DSC220 manufactured by Seiko Instruments Inc.]. Furthermore, the sample was cooled to 30° C. at a rate of temperature drop of 10° C./min and retained at that temperature for 5 minutes, and then heated to 200° C. at a rate of temperature rise of 10° C./min. An endothermic peak observed in the second temperature rise was defined as a melting peak, and a temperature at which the melting peak appeared was determined as the melting point (Tm).

Mooney Viscosity ($ML_{1+4}$)

The Mooney viscosity ($ML_{1+4}$) was measured at 100° C. by a method according to JIS K6395.

[Evaluation of Physical Properties of Crosslinked Foamed Product]

Specific Gravity

The specific gravity was measured according to JIS K7222. When the foamed product was a cube, a sample was prepared in a state where a skin located at 20 mm or more inside from each of four sides of a flat surface having the maximum area remained on the surface of such a parallel flat surface. For example, in the case of a midsole, a sample was prepared in a state where a skin located at 20 mm or more inside from each end remained on each of both substantially parallel flat surfaces.

The average value in the measurement at five sites is adopted. The difference between the maximum and minimum measurement values of the specific gravity at five sites, which is a measure of the uniformity of the quality of the foamed product, is preferably 0.08 or less, still more preferably 0.06 or less. A range of more than 0.08 means that the quality (hardness, mechanical properties, compression set, and the like) of the molded product is not uniform.

Asker C Hardness

The Asker C hardness was measured under an environment of 23° C. according to the "Spring Hardness Test Type C Test Method" described in JIS K7312-1996 Annex 2.

Rebound Resilience

The rebound resilience was measured according to JIS K6255. A sample was prepared by the same method as for the sample used in (2) Compression set (CS) described above, and then subjected to measurement under an atmosphere of 23° C.

Split Tear Strength

The split tear strength was measured under an environment of a testing temperature of 23° C. by using a testing machine 205X manufactured by Intesco Co., Ltd. A sample prepared in the form of a strip having a width of 25 mm and a thickness of 15 mm was set at a distance between chucks of 30 mm, and peeled at a testing speed of 50 ram/min in the thickness direction. The split tear strength S (N/mm) was calculated by the following equation.

$$S = S0/S1$$

S0: Tear stress (N)
S1: Sample width (mm)

Compression Set (CS)

The compression set (CS) was measured according to JIS K6262. A sample used was one having a thickness of 10 mm obtained by cutting the foamed product into a cylindrical shape having a diameter of 30 mm and a thickness of 15 mm or more, and taking out each of two parallel flat surfaces of such a cylinder from each of the surfaces of the parallel flat surfaces to allow a skin to remain on one side.

When the foamed product to be sampled is a three dimensional object having various shapes, the foamed product was also cut into a cylindrical shape having a diameter of 30 mm and a length of 15 mm or more, and then a sample having a thickness of 10 mm was obtained from each of the two parallel flat surfaces of the cylinder, with its skin layer remaining on one surface.

A dumbbell type cylindrical cutter can be used to cut the foamed product into a cylindrical shape and to cut off a sample from each of the surfaces of the parallel flat surfaces of the foamed product. The sample was compressed by 50%, left to stand in an environment of 50° C. for 6 hours, and the compression set was measured 30 minutes after the sample was released from the compression. The compression set (CS) was calculated by the following equation:

$$CS = (t0-t1)/(t0-t2) \times 100$$

t0: original sample thickness (mm)
t1: thickness of sample after 30 minutes of removal from compression apparatus (mm)
t2: spacer thickness (mm)

Heat Shrinkage Rate

The heat shrinkage rate was measured at 30 minutes after the foamed product after molding was subjected to heat treatment under an environment of 70° C. for 60 minutes and removed under an environment of 23° C. The heat shrinkage rate (Sh) (%) was calculated from the following equation.

$$Sh = s1/s0 \times 100$$

s0: longitudinal length (mm) of sample before heat treatment
s1: longitudinal length (mm) of sample after heat treatment Example 1

Production of Ethylene/1-Butene Copolymer (A-1)

Copolymerization of ethylene and 1-butene was carried out continuously at a polymerization temperature of 130° C. and a polymerization pressure of 2.5 MPaG by use of a stainless steel polymerization vessel (stirring rotation speed=250 rpm) having an internal volume of 100 L, equipped with a stirring blade. The copolymerization reaction was performed by continuously supplying dehydrated and purified hexane at 22 L/h, ethylene at 4.8 kg/h and 1-butene at 2.0 kg/h, and hydrogen at 100 NL/h, di(p-tolyl) methylene(cyclopentadienyl) (octamethyloctahydrodibenzofluorenyl)zirconium dichloride at 0.003 mmol/h, methylaluminoxane at 1.5 mmol/h in terms of aluminum, and triisobutylaluminum at 5 mmol/h, from the side of the polymerization vessel. A hexane solution of the ethylene/1-butene copolymer produced was continuously discharged from a discharge port provided at the sidewall of the polymerization vessel, while the opening degree of a valve for controlling the liquid surface level was regulated such that the amount of the solution in the polymerization vessel was maintained at 28 L. The hexane solution of the ethylene/1-butene copolymer obtained was introduced to a heater and heated to 180° C., methanol as a catalyst deactivating agent was added at 80 mL/h to terminate polymerization, and the resultant was continuously transferred to a devolatilization step under reduced pressure, and dried to obtain an ethylene/1-butene copolymer (A-1).

The ethylene/1-butene copolymer (A-1) obtained as described above had a density d of 905 kg/m$^3$, an $MFR_{2.16}$ of 0.5 g/10 min, an $MFR_{10}$ of 3.9 g/10 min, a ratio $MFR_{10}/MFR_{2.16}$ of 7.8, an Mw/Mn of 2.1, an amount of vinyl-type double bonds of 0.049/1000C, and a melting point of 94° C., and was obtained at a yield of 7.0 kg/h.

Production of Ethylene Copolymer Composition/Crosslinked Foamed Product

After a mixture including 5 parts by mass of the ethylene/1-butene copolymer (A-1) obtained as above, 20 parts by mass of copolymer rubber (B-1) (EPDM, trade name Mitsui EPT 3092PM, manufactured by Mitsui Chemicals, Inc.), 75 parts by mass of an ethylene vinyl acetate copolymer (C-1) (VA content=28% by weight, trade name Evaflex EV270, manufactured by Dow-Mitsui Polychemicals Co., Ltd.), 0.6 parts by mass of an acrylate derivative masterbatch (trade name ZnRicon 50, manufactured by Sambu fine chemical), 2.0 parts by mass of zinc oxide, 0.7 parts by mass of stearic acid, 0.6 parts by mass of an acrylate derivative masterbatch (trade name IB50, manufactured by Sambu fine chemical), 5.0 parts by mass of titanium oxide, 1.0 part by mass of zinc stearate, 1.0 part by mass of dicumyl peroxide (DCP), 4.7 parts by mass of azodicarbonamide, and 2 parts by mass of silicon rubber (polymer silicon rubber compound, trade name CF201U, manufactured by Dow Corning Corp.) was kneaded by a roll at a roll surface temperature of 120° C. for 10 minutes, the mixture was formed into a pellet with a single-screw extruder equipped with a twin tapered screw at a temperature equal to or less than the temperature (about 130° C.) at which neither crosslinking nor foaming, of the mixture, was initiated. Herein, the content of the constitutional unit derived from ethylene in the copolymer (B-1) was 65% by mass, and the Mooney viscosity ($ML_{1+4}$) measured at 100° C. was 90.

The pellet of the ethylene copolymer composition obtained was charged into an injection foaming molding machine (manufactured by King Steel Corporation) to obtain a crosslinked foamed product. The molding conditions were 100 kg/cm$^2$, 170° C., 7 minutes, and the injection foaming conditions (injection cylinder conditions) were set to an injection pressure of 90 kg/cm$^2$, a cylinder temperature of: C1/C2/C3/C4=80/85/90/95° C., and an injection rate of: C1/C2/C3/C4=28/26/24/22%. The size of the mold was 10 mm in thickness, 180 mm in length, and 60 mm in width.

The crosslinked foamed product obtained was annealed at 60° C. for 30 minutes immediately after molding, and the specific gravity, the compression set, the Asker C hardness, the rebound resilience, the split tear strength and the heat shrinkage rate were measured after 24 hours according to the above methods. The results are shown together in Table 1.

The MFR measurement of this crosslinked foamed product was carried out at a temperature of 190° C. and at a load of 2.16 kg, but the crosslinked foamed product had no fluidity. In other words, the crosslinked foamed product had an $MFR_{2.16}$ of less than 0.01 g/10 min.

Example 2

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that 0.9 parts by mass of dicumyl peroxide (DCP) and 4.4 parts by mass of azodicarbonamide were adopted in Example 1. The results are shown together in Table 1.

Example 3

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that 0.8 parts by mass of dicumyl peroxide (DCP) and 4.2 parts by mass of azodicarbonamide were adopted in Example 1. The results are shown together in Table 1.

Comparative Example 1

Production of Ethylene/1-Butene Copolymer (A-2)

Copolymerization of ethylene and 1-butene was carried out continuously in a completely filled state at a polymerization temperature of 130° C. by use of a stainless steel polymerization vessel (stirring rotation speed=500 rpm) having a substantial internal volume of 1 L, equipped with a stirring blade. The copolymerization reaction was performed by continuously supplying hexane at 1.82 L/h, ethylene at 56 g/h, 1-butene at 40 g/h, hydrogen at 0.6 NL/h, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium dichloride at 0.0001 mmol/h, a methylaluminoxane/toluene solution at 0.05 mmol/h in terms of aluminum, and triisobutylaluminum at 1.0 mmol/h, from the side of the polymerization vessel to a liquid phase, and retaining the polymerization pressure at 3.8 MPaG. A hexane solution of an ethylene/1-butene copolymer continuously obtained was stored in a holding drum, and methanol as a catalyst deactivating agent was added thereto at 0.2 ml/h to terminate polymerization.

The hexane solution of the ethylene/1-butene copolymer obtained was taken out every one hour, and the polymer was precipitated from the polymerization solution in 2 L of methanol, and dried under vacuum at 130° C. for 10 hours to obtain an ethylene/1-butene copolymer (A-2).

The ethylene/1-butene copolymer (A-2) obtained as above had a density d of 905 kg/m$^3$, an $MFR_{2.16}$ of 1.2 g/10 min, an $MFR_{10}$ of 7.9 g/10 min, a ratio $MFR_{10}/MFR_{2.16}$ of 6.6, an Mw/Mn of 2.0, an amount of vinyl-type double bonds of 0.020/1000C, and a melting point of 94° C., and was obtained at a yield of 43.5 g/h.

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that the ethylene/1-butene copolymer (A-2) instead of the ethylene/1-butene copolymer (A-1) was used and the amount of azodicarbonamide added was 4.6 parts by mass in Example 1. The results are shown together in Table 1.

Comparative Example 2

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that 0 parts by mass of the ethylene/1-butene copolymer (A-1) and 25 parts by mass of EPDM [trade name Mitsui EPT 3092PM] were adopted in Example 1. The results are shown together in Table 1.

Examples 4 to 7

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that the amounts of the ethylene/1-butene copolymer (A-1), the copolymer rubber (B-1), dicumyl peroxide (DCP) and azodicarbonamide compounded in Example 1 were respectively amounts described in Table 1 (parts by mass). The results are shown together in Table 1.

Examples 8 to 10

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that copolymer rubber (B-2) (EPDM, trade name Mitsui EPT 2060M, manufactured by Mitsui Chemicals, Inc., content of constitutional unit derived from ethylene: 55% by mass, Mooney viscosity ($ML_{1+4}$) measured at 100° C.: 60) instead of the copolymer rubber (B-1) was used and the amounts of the components were respectively amounts described in Table 1 (parts by mass) in Example 1. The results are shown together in Table 1.

Example 11

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that 20 parts by mass of copolymer rubber (B-3) (EPDM, trade name Mitsui EPT 3045, manufactured by Mitsui Chemicals, Inc., content of constitutional unit derived from ethylene: 56% by mass, Mooney viscosity ($ML_{1+4}$) measured at 100° C.: 40) instead of the copolymer rubber (B-1) was used and the amount of azodicarbonamide added was 4.6 parts by mass in Example 1. The results are shown together in Table 1.

Comparative Example 3

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition and a crosslinked foamed product and evaluate physical properties except that 0 parts by mass of the copolymer rubber (B-1), 75 parts by mass of the ethylene vinyl acetate copolymer (C-1), 3.5 parts by mass of azodicarbonamide and 0.9 parts by mass of dicumyl peroxide (DCP) were adopted in Example 1. The results are shown together in Table 1. The crosslinked molded article obtained was lower in rebound resilience than those of Examples 1 to 3.

[Table 1]

TABLE 1

| | | Example 1 | Example 2 | Example 3 | Comparative Example 1 | Comparative Example 2 |
|---|---|---|---|---|---|---|
| Compositions (parts by mass) of resin components | Ethylene/1-butene copolymer (A-1) | 5 | 5 | 5 | | |
| | Ethylene/1-butene copolymer (A-2) | | | | | 5 |
| | EPDM(B-1) | 20 | 20 | 20 | 20 | 25 |
| | EPDM(B-2) | | | | | |
| | EPDM(B-3) | | | | | |
| | EVA (C-1)(VA28 %) | 75 | 75 | 75 | 75 | 75 |
| Formulations (parts by mass based on 100 parts by mass of resin components) of foaming agent and crosslinking agent | Azodicarbonamide | 4.7 | 4.4 | 4.2 | 4.6 | 4.7 |
| | DCP | 1 | 0.9 | 0.8 | 1 | 1 |
| Physical properties of crosslinked foamed product (injection molded article) | Specific gravity | 0.22 | 0.22 | 0.22 | 0.22 | 0.22 |
| | Asker C hardness | 48 | 47 | 47 | 48 | 47 |
| | Rebound resilience | 58 | 58 | 58 | 58 | 54 |
| | Split tear strength (kg/cm) | 2.2 | 2.6 | 2.8 | 2.2 | 2.3 |
| | Compression set (CS) (%) | 54 | 58 | 62 | 55 | 55 |
| | Heat shrinkage rate (%) at 70° C. × 60 minutes | 2.9 | 2.7 | 2.8 | 3 | 3.2 |

| | | Example 4 | Example 5 | Example 6 | Example 7 | Example 8 |
|---|---|---|---|---|---|---|
| Compositions (parts by mass) of resin components | Ethylene/1-butene copolymer (A-1) | 10 | 10 | 2.5 | 2.5 | 10 |
| | Ethylene/1-butene copolymer (A-2) | | | | | |
| | EPDM(B-1) | 40 | 40 | 47.5 | 47.5 | |
| | EPDM(B-2) | | | | | 40 |
| | EPDM(B-3) | | | | | |
| | EVA (C-1)(VA28 %) | 50 | 50 | 50 | 50 | 50 |
| Formulations (parts by mass based on 100 parts by mass of resin components) of foaming agent and crosslinking agent | Azodicarbonamide | 6.5 | 6.2 | 6.5 | 6.2 | 5.6 |
| | DCP | 0.8 | 0.7 | 0.8 | 0.7 | 0.9 |
| Physical properties of crosslinked foamed product (injection molded article) | Specific gravity | 0.22 | 0.22 | 0.22 | 0.22 | 0.22 |
| | Asker C hardness | 49 | 48 | 47 | 46 | 47 |
| | Rebound resilience | 63 | 63 | 63 | 63 | 63 |
| | Split tear strength (kg/cm) | 1.9 | 2.2 | 1.8 | 2.1 | 1.8 |
| | Compression set (CS) (%) | 44 | 46 | 42 | 44 | 46 |
| | Heat shrinkage rate (%) at 70° C. × 60 minutes | 2.2 | 2 | 2.5 | 2.3 | 2.1 |

TABLE 1-continued

|  |  | Example 9 | Example 10 | Example 11 | Comparative Example 3 |
|---|---|---|---|---|---|
| Compositions (parts by mass) of resin components | Ethylene/1-butene copolymer (A-1) | 10 | 10 | 5 | 25 |
|  | Ethylene/1-butene copolymer (A-2) |  |  |  |  |
|  | EPDM(B-1) |  |  |  |  |
|  | EPDM(B-2) | 40 | 40 |  |  |
|  | EPDM(B-3) |  |  | 20 |  |
|  | EVA (C-1)(VA28 %) | 50 | 50 | 75 | 75 |
| Formulations (parts by mass based on 100 parts by mass of resin components) of foaming agent and crosslinking agent | Azodicarbonamide | 5.3 | 5.1 | 4.6 | 3.5 |
|  | DCP | 0.8 | 0.7 | 1 | 0.9 |
| Physical properties of crosslinked foamed product (injection molded article) | Specific gravity | 0.22 | 0.22 | 0.22 | 0.22 |
|  | Asker C hardness | 46 | 45 | 47 | 59 |
|  | Rebound resilience | 63 | 63 | 60 | 50 |
|  | Split tear strength (kg/cm) | 1.9 | 2.1 | 2 | 3.3 |
|  | Compression set (CS) (%) | 50 | 52 | 60 | 59 |
|  | Heat shrinkage rate (%) at 70° C. × 60 minutes | 1.9 | 1.7 | 3.1 | 1.0 |

Results of Evaluation of Crosslinked Foamed Product and Results of Evaluation of Molding Stability It was confirmed from Examples and Comparative Examples described above that a case of use of the ethylene copolymer composition of the present invention containing specified ethylene/α-olefin copolymer and ethylene/α-olefin having 3 to 20 carbon atoms/non-conjugated polyene copolymer rubber tended to provide properties including a low heat shrinkage rate, an excellent tear strength and a small compression set in a well-balanced manner, as compared with Comparative Example 1 where the vinyl group content in the ethylene/α-olefin copolymer was low, Comparative Example 2 where no ethylene/α-olefin copolymer was used, and Comparative Example 3 where no ethylene/α-olefin having 3 to 20 carbon atoms/non-conjugated polyene copolymer rubber was used.

Example 12

Production of Ethylene Copolymer Composition/Crosslinked Foamed Product, and Evaluation of Physical Properties and Evaluation of Molding Stability The same manner as in Example 1 was performed to thereby produce a pellet of an ethylene copolymer composition except that 20 parts by mass of the ethylene/1-butene copolymer (A-1), 80 parts by mass of the copolymer rubber (B-1), 2.0 parts by mass of zinc oxide, 1.0 part by mass of stearic acid, 5.0 parts by mass of titanium oxide, 4.5 parts by mass of azodicarbonamide and 0.3 parts by mass of dicumyl peroxide (DCP) were adopted.

A press mold was filled with the pellet of the ethylene copolymer composition obtained, and the pellet was pressurized and heated in conditions of 150 kg/cm², 170° C., and 13 minutes to obtain a foamed product. The size of the press mold was 12.5 mm in thickness, 175 mm in length, and 105 mm in width.

The crosslinked foamed product obtained was annealed at 60° C. for 30 minutes immediately after molding, and the specific gravity, the compression set, the Asker C hardness, the rebound resilience and the split tear strength were measured after 24 hours according to the above methods. The results are shown in Table 2.

Comparative Example 4

Production of Ethylene Copolymer Composition/Crosslinked Foamed Product, and Evaluation of Physical Properties and Evaluation of Molding Stability The same manner as in Example 11 was performed to thereby produce a pellet of an ethylene copolymer composition and a crosslinked foamed product and evaluate physical properties except that 100 parts by mass of the ethylene/1-butene copolymer (A-1), 0 parts by mass of the copolymer rubber (B-1), 5.5 parts by mass of azodicarbonamide and 1 part by mass of dicumyl peroxide (DCP) were adopted. The results are shown in Table 2.

TABLE 2

|  |  | Example 12 | Comparative Example 4 |
|---|---|---|---|
| Compositions (parts by mass) of resin components | Ethylene/1-butene copolymer (A-1) | 20 | 100 |
|  | EPDM (B-1) | 80 |  |
| Formulations (parts by mass based on 100 parts by mass of resin components) of foaming agent and crosslinking agent | Azodicarbonamide | 4.5 | 5.5 |
|  | DCP | 0.3 | 1 |
| Physical properties of crosslinked foamed product (press molded article) | Specific gravity | 0.22 | 0.23 |
|  | Asker C hardness | 48 | 74 |
|  | Rebound resilience | 64 | 38 |
|  | Split tear strength (kg/cm) | 2.1 | 3.7 |
|  | Compression set (CS) (%) | 45 | 28 |

It was found that, while the crosslinked foamed product obtained in Example 12 was high in rebound resilience and small in compression set, the crosslinked foamed product obtained in Comparative Example 4 where no ethylene/α-olefin having 3 to 20 carbon atoms/non-conjugated polyene copolymer rubber was included, although was small in compression set, was low in rebound resilience.

INDUSTRIAL APPLICABILITY

The ethylene copolymer composition of the present invention is suitable for production of various molded articles and foamed products, and particularly suitable for production of a crosslinked molded article and a crosslinked foamed product, and can be used in conventionally known applications without any limitation. For example, the ethylene copolymer composition of the present invention, and the molded article, the foamed product and the laminated product each using the ethylene copolymer composition can be used for interior and exterior automotive parts such as interior surface materials for automobiles, weather strip sponges, body panels, steering wheels and side shields; civil and building materials such as sheets for soil improvement, water sealing plates and noise abatement walls; industrial parts; footwear parts such as shoe soles and sandals; electric and electronic parts such as wire coverings, connectors, and cap plugs; sports and leisure goods such as golf club grips, baseball bat grips, swimming fins and swimming goggles; and miscellaneous goods such as gaskets, waterproof clothes, garden hoses, belts, drainer sheets and powder puffs. In particular, these can be suitably used for footwear parts such as shoe soles, shoe midsoles, innersoles, soles and sandals.

The invention claimed is:

1. An ethylene copolymer composition comprising:
   an ethylene copolymer (A) which is a copolymer obtained by copolymerizing only ethylene and an α-olefin having 3 to 20 carbon atoms and which satisfies all the following requirements (A-a), (A-b), (A-c) and (A-d),
   ethylene/α-olefin having 3 to 20 carbon atoms/non-conjugated polyene copolymer rubber (B), and
   an ethylene/polar monomer copolymer (C);
   wherein a mass ratio [(A)/(C)] between the ethylene copolymer (A) and the ethylene/polar monomer copolymer (C) is in the range of 1/99 to 19/81;
   (A-a) a vinyl group content per 1,000 carbon atoms as determined by $^1$H-NMR is in the range of 0.025 to 0.3,
   (A-b) a ratio $MFR_{10}/MFR_{2.16}$ is in the range of 7 to 20 (wherein $MFR_{10}$ is a melt flow rate as measured at 190° C. and at a load of 10 kg by a method according to ASTM D1238, and $MFR_{2.16}$ is a melt flow rate as measured at 190° C. and at a load of 2.16 kg by a method according to ASTM D1238),
   (A-c) a density is in the range of 0.850 to 0.910 g/cm$^3$, and
   (A-d) a melt flow rate ($MFR_{2.16}$) as measured at 190° C. and at a load of 2.16 kg by a method according to ASTM D1238 is in the range of 0.01 to 200 g/10 min.

2. The ethylene copolymer composition according to claim 1, wherein a mass ratio [(A)/(B)] between the ethylene copolymer (A) and the ethylene/α-olefin having 3 to 20 carbon atoms/non-conjugated polyene copolymer rubber (B) is in the range of 5/95 to 80/20.

3. The ethylene copolymer composition according to claim 1, wherein the ethylene copolymer (A) is an ethylene/1-butene copolymer.

4. The ethylene copolymer composition according to claim 1, further comprising a foaming agent (D), a crosslinking agent (E) or a combination thereof.

5. A foamed product obtained by crosslinking and foaming the ethylene copolymer composition according to claim 4.

6. The foamed product according to claim 5, wherein a rebound resilience as measured by a method according to JIS K6255 is 55% or more.

7. The foamed product according to claim 5, wherein a heat shrinkage rate (Sh) after a lapse of 30 minutes under an environment of 23° C. after heat treatment of the foamed product under an environment of 70° C. for 60 minutes is less than 3.0%.

8. A laminated product having a layer including the foamed product according to claim 5 and a layer including one or more raw materials selected from the group consisting of polyolefin, polyurethane, rubber, leather and artificial leather.

9. Footwear obtained by using the laminated product according to claim 8.

10. A footwear part obtained by using the laminated product according to claim 8.

11. The footwear part according to claim 10, wherein the footwear part is a midsole, an innersole or a sole.

12. Footwear obtained by using the foamed product according to claim 5.

13. A footwear part obtained by using the foamed product according to claim 5.

14. The footwear part according to claim 13, wherein the footwear part is a midsole, an innersole or a sole.

15. An ethylene copolymer composition comprising:
   5 to 30 parts by mass of an ethylene copolymer (A) which is a copolymer obtained by copolymerizing only ethylene and an α-olefin having 3 to 20 carbon atoms and which satisfies all the following requirements (A-a), (A-b), (A-c) and (A-d),
   95 to 70 parts by mass of ethylene/α-olefin having 3 to 20 carbon atoms/non-conjugated polyene copolymer rubber (B) satisfying at least one of the following requirements (B-a) and (B-b) (wherein a total amount of the ethylene copolymer (A) and the ethylene/α-olefin having 3 to 20 carbon atoms/non-conjugated polyene copolymer rubber (B) is 100 parts by mass);
   (A-a) a vinyl group content per 1,000 carbon atoms as determined by $^1$H-NMR is in the range of 0.025 to 0.3,
   (A-b) a ratio $MFR_{10}/MFR_{2.16}$ is in the range of 7 to 20 (wherein $MFR_{10}$ is a melt flow rate as measured at 190° C. and at a load of 10 kg by a method according to ASTM D1238, and $MFR_{2.16}$ is a melt flow rate as measured at 190° C. and at a load of 2.16 kg by a method according to ASTM D1238),
   (A-c) a density is in the range of 0.850 to 0.910 g/cm$^3$, and
   (A-d) a melt flow rate ($MFR_{2.16}$) as measured at 190° C. and at a load of 2.16 kg by a method according to ASTM D1238 is in the range of 0.01 to 200 g/10 min, and
   (B-a) a content of a constitutional unit derived from ethylene is in the range of 60 to 95% by mass, and
   (B-b) a Mooney viscosity ($ML_{1+4}$) as measured at 100° C. by a method according to JIS K6395 is in the range of 50 to 120.

16. The ethylene copolymer composition according to claim 15, further comprising an ethylene/polar monomer copolymer (C).

17. A method for producing a foamed product, comprising a step of foaming the ethylene copolymer composition according to claim 1.

* * * * *